(12) United States Patent
Hale

(10) Patent No.: US 8,985,510 B2
(45) Date of Patent: Mar. 24, 2015

(54) TIE ROD LOCK

(71) Applicant: Parker-Hannifin Corporation, Cleveland, OH (US)

(72) Inventor: Brian Curtis Hale, Syracuse, UT (US)

(73) Assignee: Parker-Hannifin Corporation, Cleveland, OH (US)

( * ) Notice: Subject to any disclaimer, the term of this patent is extended or adjusted under 35 U.S.C. 154(b) by 129 days.

(21) Appl. No.: 13/678,229

(22) Filed: Nov. 15, 2012

(65) Prior Publication Data

US 2013/0313358 A1     Nov. 28, 2013

Related U.S. Application Data

(60) Provisional application No. 61/559,960, filed on Nov. 15, 2011.

(51) Int. Cl.
| | |
|---|---|
| *B64C 3/38* | (2006.01) |
| *B64C 5/10* | (2006.01) |
| *B64C 9/00* | (2006.01) |
| *B64C 13/00* | (2006.01) |
| *B64C 13/28* | (2006.01) |
| *F16H 25/22* | (2006.01) |
| *B64C 5/16* | (2006.01) |

(52) U.S. Cl.
CPC ............ *B64C 13/28* (2013.01); *F16H 25/2204* (2013.01); *B64C 5/16* (2013.01)
USPC .......................... 244/99.9; 244/99.2; 244/99.3

(58) Field of Classification Search
USPC ....... 244/75.1, 99.2–99.4, 99.9, 45 R, 46, 48; 74/89.26
See application file for complete search history.

(56) References Cited

U.S. PATENT DOCUMENTS

| | | | | |
|---|---|---|---|---|
| 2,701,478 | A * | 2/1955 | Riess | 74/89.38 |
| 2,875,631 | A * | 3/1959 | Syring | 74/89.39 |
| 4,431,093 | A * | 2/1984 | Yang | 188/378 |
| 6,467,363 | B2 * | 10/2002 | Manzanares et al. | 74/89.39 |
| 6,672,540 | B1 * | 1/2004 | Shaheen et al. | 244/99.3 |
| 7,299,702 | B2 | 11/2007 | Gibert | |
| 7,610,828 | B2 * | 11/2009 | Wingett et al. | 74/424.78 |
| 8,033,500 | B1 | 10/2011 | Charadeffine et al. | |
| 8,291,782 | B1 * | 10/2012 | Shaheen et al. | 74/89.26 |
| 8,496,204 | B1 * | 7/2013 | Charafeddine et al. | 244/99.4 |
| 8,714,479 | B1 * | 5/2014 | Chapman | 244/99.3 |
| 2010/0264263 | A1 | 10/2010 | Shaheen et al. | |

* cited by examiner

*Primary Examiner* — Philip J Bonzell
(74) *Attorney, Agent, or Firm* — Renner, Otto, Boiselle & Sklar LLP

(57) ABSTRACT

A stabilizer actuator has a first end for connecting to an aircraft support structure and a second end for connecting to a stabilizer. The actuator includes a primary load path for transmittal of loads acting on the stabilizer to the aircraft support structure, and a secondary load path for transmittal of loads acting on the stabilizer to the aircraft support structure upon failure of the primary load path. The secondary load path includes a tie rod extending along a longitudinal axis, a load path locking mechanism coupled to the tie rod, a lock housing having a central bore for receiving the locking mechanism, and at least one radially movable segment that, upon failure of the primary load path, moves radially to lock the tie rod to the lock housing against axial and/or radial movement.

25 Claims, 31 Drawing Sheets

TIE ROD LOCK

RELATED APPLICATIONS

This application claims the benefit of U.S. Provisional Application No. 61/559,960 filed Nov. 15, 2011, which is hereby incorporated herein by reference.

FIELD OF INVENTION

The present invention relates generally to aircraft actuators, and more particularly to engaging a secondary load path in a horizontal stabilizer trim actuator of an aircraft.

BACKGROUND

Aircraft typically include a plurality of flight control surfaces that, when controllably positioned, guide the movement of the aircraft from one destination to another. The number and type of flight control surfaces included in an aircraft may vary, but typically include both primary flight control surfaces and secondary flight control surfaces. The primary flight control surfaces are those that are used to control aircraft movement in the pitch, yaw, and roll axes, and the secondary flight control surfaces are those that are used to influence the lift or drag (or both) of the aircraft. Although some aircraft may include additional control surfaces, the primary flight control surfaces typically include a pair of elevators, a rudder, and a pair of ailerons, and the secondary flight control surfaces typically include a plurality of flaps, slats, and spoilers.

Modern aircraft have horizontal stabilizers located at the tail section of the fuselage or the rudder section that are pivotally supported relative to the airplane fuselage to "trim" the aircraft during flight by selective adjustment by the operator or pilot from an internal control unit. This involves adjusting the position of the horizontal stabilizer by a stabilizer actuator to accommodate different load distributions within the aircraft and different atmospheric conditions, i.e. wind, rain, snow, etc. In this regard the stabilizer is traditionally pivotally connected to the tail section of the fuselage at a point generally midway along its length. One common trimmable stabilizer actuator consists of a primary ball nut assembly connected with an actuating drive gimbal which is pivotally connected to one end of the horizontal stabilizer structure. The ball nut assembly includes a ball nut housing and a rotatable ballscrew extending axially and usually vertically through the ball nut housing and a drive gimbal housing. The ball nut housing is connected to the drive gimbal housing by a trunnion segment. The ballscrew, in turn, may have its upper end remote from the actuating drive gimbal and may be fixed from translation or axial movement by a connection to a second, support gimbal which is pivotally secured to the tail section. As the ballscrew is rotated, the drive gimbal will be moved in translation relative to it. Thus, as the ballscrew is rotated in one direction, the leading edge of the horizontal stabilizer is pivoted upward, whereas by rotating the ballscrew in the other direction, the leading edge of the horizontal stabilizer is pivoted downward. Rotation of the ballscrew is routinely done by a motor and associated gearing which is connected to the second, fixed support gimbal and which is actuated by the operator or pilot by the internal control unit. The connection of the stabilizer actuator to the stabilizer is often located within the fuselage tail section and not directly in the air stream.

The horizontal stabilizer movement, as controlled by the operator, is transmitted by the ballscrew through the actuating drive gimbal by way of the primary ball nut assembly which defines a primary load path. The movement has a load with tensile and compressive components as well as a torque component due to the ballscrew thread lead. Failures of the primary load path such as caused by fracture and separation of the ballscrew shaft or ballscrew flange or failure of a primary load path attachment can result in the complete loss of control of the horizontal stabilizer. However, stabilizer actuators have always been provided with a secondary load path as a protection against the catastrophic failure of the primary path (ball screw or its attachment points). In such structures, the primary load path is normally controllably actuated by the operator and is thus under load while the secondary load path is normally unloaded.

SUMMARY OF INVENTION

The present invention provides a stabilizer actuator having a primary and secondary load path. The secondary load path is provided for transmitting loads acting on the stabilizer to an aircraft support structure upon failure of the primary load path. The secondary load path includes a tie rod extending along a longitudinal axis, a load path locking mechanism coupled to the tie rod, a lock housing having a central bore for receiving the locking mechanism; and at least one radially movable segment that, upon failure of the primary load path, moves radially to lock the tie rod to the lock housing against axial and/or radial movement.

This secondary load path enables locking of the attached stabilizer in a fixed position with minimized backlash. This avoids erratic movement of the stabilizer and hence permits the pilot to regain control through other mechanisms whereby the continued flight and landing of the aircraft can be more readily controlled. Thus the locking operation of the secondary load path shall be clearly detected by the pilot or operator during the flight by shutting down the drive system and holding the horizontal stabilizer in a fixed position. Steps can then be taken to repair or replace the stabilizer actuator prior to the next flight.

Also, with the present invention it shall be possible to test the condition of the mechanism for the secondary load path to provide permanent immobilization by a readily accessible in-situ inspection structure of the mechanism during routine maintenance checks at periodic intervals. This is to ensure that the secondary load path mechanism is functional. As will be seen, the apparatus for the secondary load path includes a locking mechanism which operates in response to minimal uncontrolled movement of the stabilizer and minimal triggering loads relative to the operating load in response to a failure of the primary load path. Once it is triggered to a locked or failsafe condition the locking mechanism stays lockingly engaged regardless of varying aerodynamic loads on the stabilizer and hence on the stabilizer actuator and regardless of attempted control of the stabilizer actuator by the operator through the internal control unit. Thus the stabilizer actuator of the present invention provides:

1) permanent immobilization of the stabilizer actuator via a secondary load path to hold the stabilizer in a fixed position in the event of failure of the mechanism for the primary load path with minimal backlash;
2) the ability of the locking mechanism for the secondary load path to achieve permanent, fixed immobilization under minimal aerodynamic triggering loads;
3) the ability of the locking mechanism to keep the stabilizer actuator immobilized even though aerodynamic loads of varying magnitudes are applied to the stabilizer up to the tensile and compressive design load limits;

4) a clear signal to the operator, via the locked condition, by rendering the internal control unit ineffective, that there has been a failure in the primary load path and that repair should be done upon landing; and 5) readily accessible in-situ inspection of the locking mechanism for the secondary load path locking function during scheduled intervals to confirm that the locking mechanism should be able to operate when activated after a primary load path failure.

According to one aspect of the invention, a stabilizer actuator has a first end for connecting to an aircraft support structure and a second end for connecting to a stabilizer. The actuator includes a primary load path for transmittal of loads acting on the stabilizer to the aircraft support structure, and a secondary load path for transmittal of loads acting on the stabilizer to the aircraft support structure upon failure of the primary load path. The secondary load path includes a tie rod extending along a longitudinal axis, a load path locking mechanism coupled to the tie rod, a lock housing having a central bore for receiving the locking mechanism, and at least one radially movable segment that, upon failure of the primary load path, moves radially to lock the tie rod to the lock housing against axial and/or radial movement.

Optionally, an inner surface defining the central bore includes at least one protrusion extending radially inward from the inner surface, and the locking mechanism includes the at least one segment, and the at least one segment is configured to move radially outward from a standby position to a failsafe position to prevent relative movement of the tie rod with respect to the lock housing by interacting with the at least one protrusion.

Optionally, the at least one protrusion includes at least one inwardly extending circumferential rib and wherein the at least one segment comprises a latch segment having an outward extending circumferential flange configured to prevent relative axial movement between the tie rod and the lock housing by interacting with the at least one rib.

Optionally, the at least one protrusion includes at least one inwardly extending axial ridge and wherein the at least one segment comprises a lock segment having an outward extending axial flange configured to prevent relative radial movement between the tie rod and the lock housing by interacting with the at least one ridge.

Optionally, the locking mechanism further includes a spring pack for radially moving the segment outward from the standby position to the failsafe position.

Optionally, the spring pack includes an inner spring having a first handedness and a coaxial outer spring having a second handedness opposite the first handedness.

Optionally, the locking mechanism further includes a trigger mechanism configured to trigger movement of the segment to the failsafe position when the primary load path fails.

Optionally, the trigger mechanism includes at least one centering spring configured to bias the trigger mechanism towards a reset position.

Optionally, the at least one segment includes a hook and the trigger mechanism comprises at least one trigger latch configured to latch with the hook when the trigger mechanism is in the reset position and the segment is in the standby position, thereby retaining the segment in the standby position.

Optionally, the trigger mechanism is axially slidable with respect to the segment.

Optionally, the lock housing further includes one or more radial ports adjacent to the protrusion thereby allowing access to reset the locking mechanism from the failsafe position to the standby position.

Optionally, the stabilizer actuator further includes a threaded retainer between the locking mechanism and the tie rod for retaining the locking mechanism in the lock housing.

Optionally, the tie rod is rigidly coupled to a ballscrew of the primary load path.

Optionally, the stabilizer actuator further includes at least one protrusion having at least one inwardly extending circumferential rib and wherein the segment comprises a latch segment having an outwardly extending circumferential flange configured to prevent relative axial movement between the tie rod and the lock housing by interacting with the at least one rib, and wherein the at least one protrusion comprises an axial slot through the at least one rib forming at least one inwardly extending axial ridge and wherein the at least one segment comprises a lock segment having an outward extending axial flange configured to prevent relative radial movement between the tie rod and the lock housing by interacting with the at least one ridge.

According to another aspect of the invention, a method of testing the stabilizer actuator includes removing a lower primary load path gimbal pin to simulate a primary load path failure; applying a first load to the primary load path; and operating the actuator.

According to another aspect of the invention, a method of resetting the stabilizer actuator includes removing a plug from the one or more ports of the lock housing inserting a reset tool into the one or more ports of the lock housing to push the segment out of engagement with the protrusion.

Optionally the inserting includes threading the tool into the lock housing for increased leverage and control.

Optionally, the method further includes applying a load opposite from the load causing engagement of the locking mechanism; removing the reset tool from the lock housing; and reinstalling the plug.

According to another aspect of the invention, an actuator includes a drive motor and gear assembly; a ballscrew driven by the motor; a support gimbal for coupling the ballscrew to a support structure; a ball nut driven by the ballscrew; a tie rod extending along a longitudinal axis and rigidly coupled to the ballscrew; a locking mechanism coupled to the tie rod; a lock housing having a central bore for receiving the locking mechanism; and at least one radially movable segment that, upon structural failure of the drive motor and gear assembly, the ballscrew, and/or the support gimbal, moves radially to lock the tie rod to the lock housing against axial and/or radial movement.

Optionally, an inner surface defining the central bore includes at least one protrusion extending radially inward from the inner surface, wherein the locking mechanism includes the at least one segment, and the at least one segment is configured to move radially outward from a standby position to a failsafe position to prevent relative movement of the tie rod with respect to the lock housing by interacting with the at least one protrusion.

The foregoing and other features of the invention are hereinafter described in greater detail with reference to the accompanying drawings.

DETAILED DESCRIPTION

Figure 1:
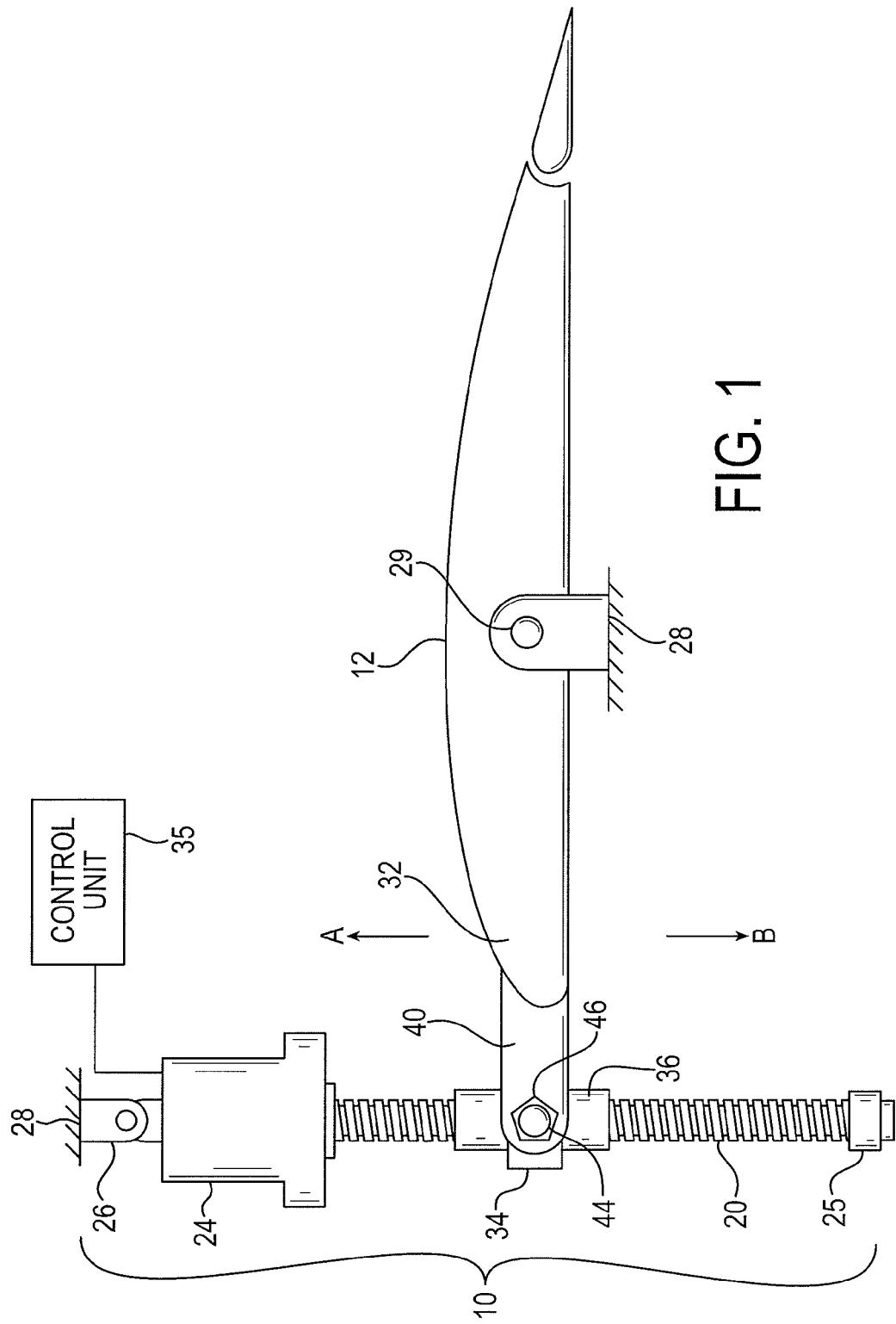
FIG. 1 shows a schematic of a representative actuator assembly and actuated control surface.

Looking now to FIG. 1, a representative stabilizer actuator 10 is shown for selectively controlling the position of a horizontal stabilizer 12. Although the actuator 10 is shown in a vertical orientation, the orientation of exemplary actuators may be different, and in particular embodiments is reversed from that which is shown in FIG. 1. The actuator 10 a primary ball nut assembly 36 connected by threads with a ballscrew 20. The ballscrew 20 may extend generally vertically and may be connected at its upper (or lower) end to a hydraulic or electric drive motor and gear assembly 24. An end cap 25 is fixed to the opposite lower (or upper) end of the ball screw 20 to assure that the ballscrew 20 will not be unthreaded from the primary ball nut assembly 36. The drive motor and gear assembly 24 is connected to an upper (or lower) support gimbal 26 which in turn is pivotally secured at a fixed position to a portion of the rudder section or tail section 28 of the fuselage. The drive motor and gear assembly 24 and the details thereof may be of a construction well known in the art and thus it is only generally shown for purposes of simplicity and brevity.

The horizontal stabilizer 12 is pivotally connected along its length by a pivot structure 29 which is fixed to the rudder section or fuselage tail section 28. The forward end 32 of the horizontal stabilizer 12 may be in turn pivotally connected to an actuating drive gimbal 34 located generally midway along the ballscrew 20 and which in turn is pivotally connected to the primary ball nut assembly 36 which is secured to the drive gimbal 34. As noted, the connection of stabilizer actuators to the rudder section or fuselage tail section is common and well known and thus details of the rudder or tail section 28 have been omitted for purposes of brevity and simplicity.

In order to selectively set the position of the horizontal stabilizer 12, the pilot through operation of an internal control unit 35 will energize the drive motor and gear assembly 24 to rotate the ballscrew 20 in one direction which will move the primary ball nut assembly 36 and drive gimbal 34 upward along the axially fixed ballscrew 20 to pivot the forward end 32 of the stabilizer 12 upward or to rotate the ballscrew 20 in the opposite direction which will move the primary ball nut assembly 36 and drive gimbal 34 downward along the fixed ballscrew 20 to pivot the forward end 32 downward. The surface 12 may be connected to the ball nut 36 via structure 40 by means of a pivot rod 44 secured by a nut 46 or the like. As this occurs the stabilizer actuator 10 may pivot at the fixed support gimbal 26 and pivot at the movable drive gimbal 34 to accommodate the angular, arcuate displacement of the forward end 32 of the stabilizer 12. As noted, apparatuses such as an internal control unit 35 are well known in the art and thus details thereof have been omitted for purposes of brevity and simplicity.

Also such basic operative connections as noted above, are well known in existing stabilizer actuator structures. As will be seen, in the present invention, upon failure of the primary load path section (ballscrew 20 or drive motor and gear assembly 24 or support gimbal 26) a secondary load path section will activate to lock the stabilizer 12 in a fixed position.

Figure 2:
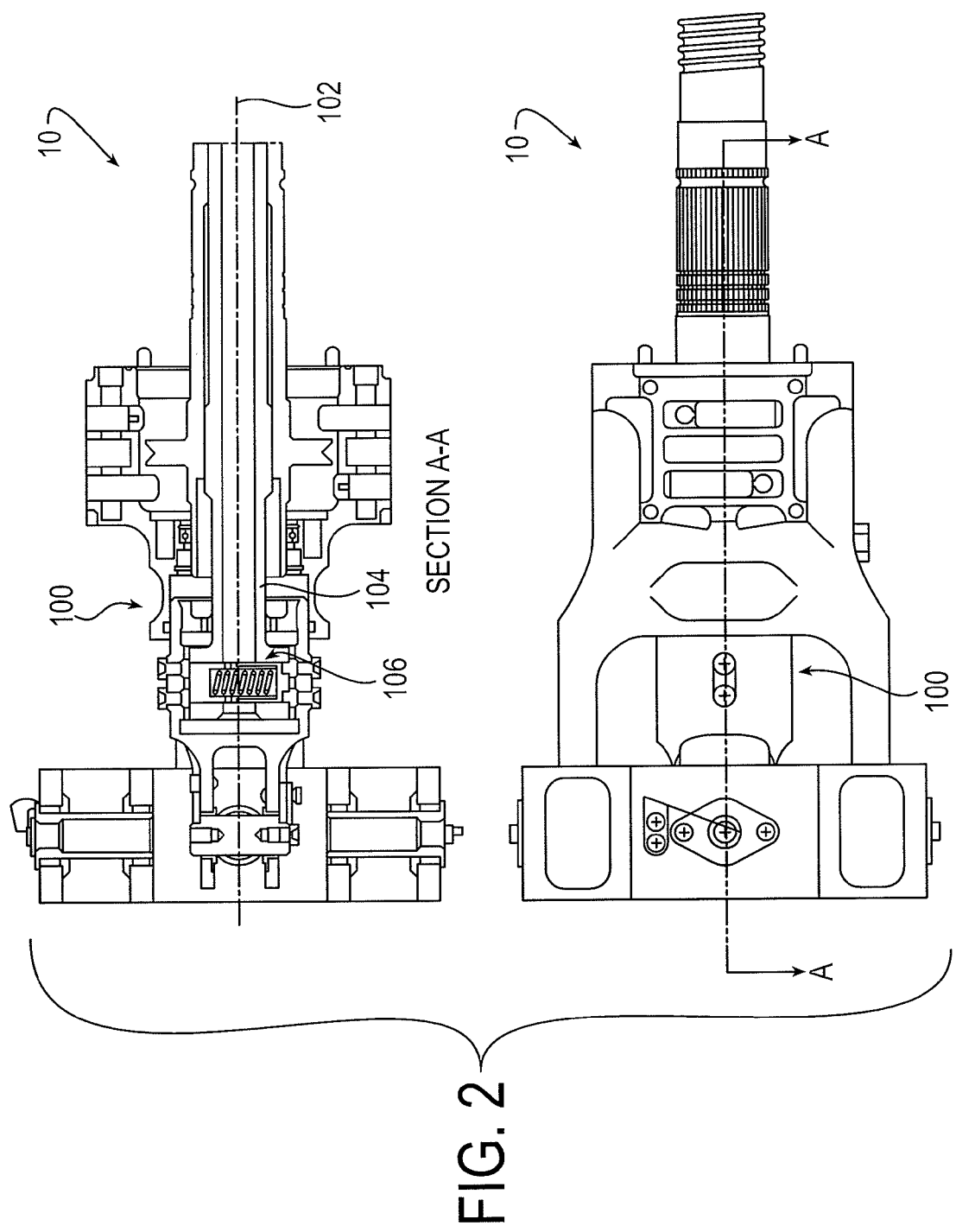
FIG. 2 shows a partial side and partial cross-sectional view of an exemplary actuator.
Figure 3:
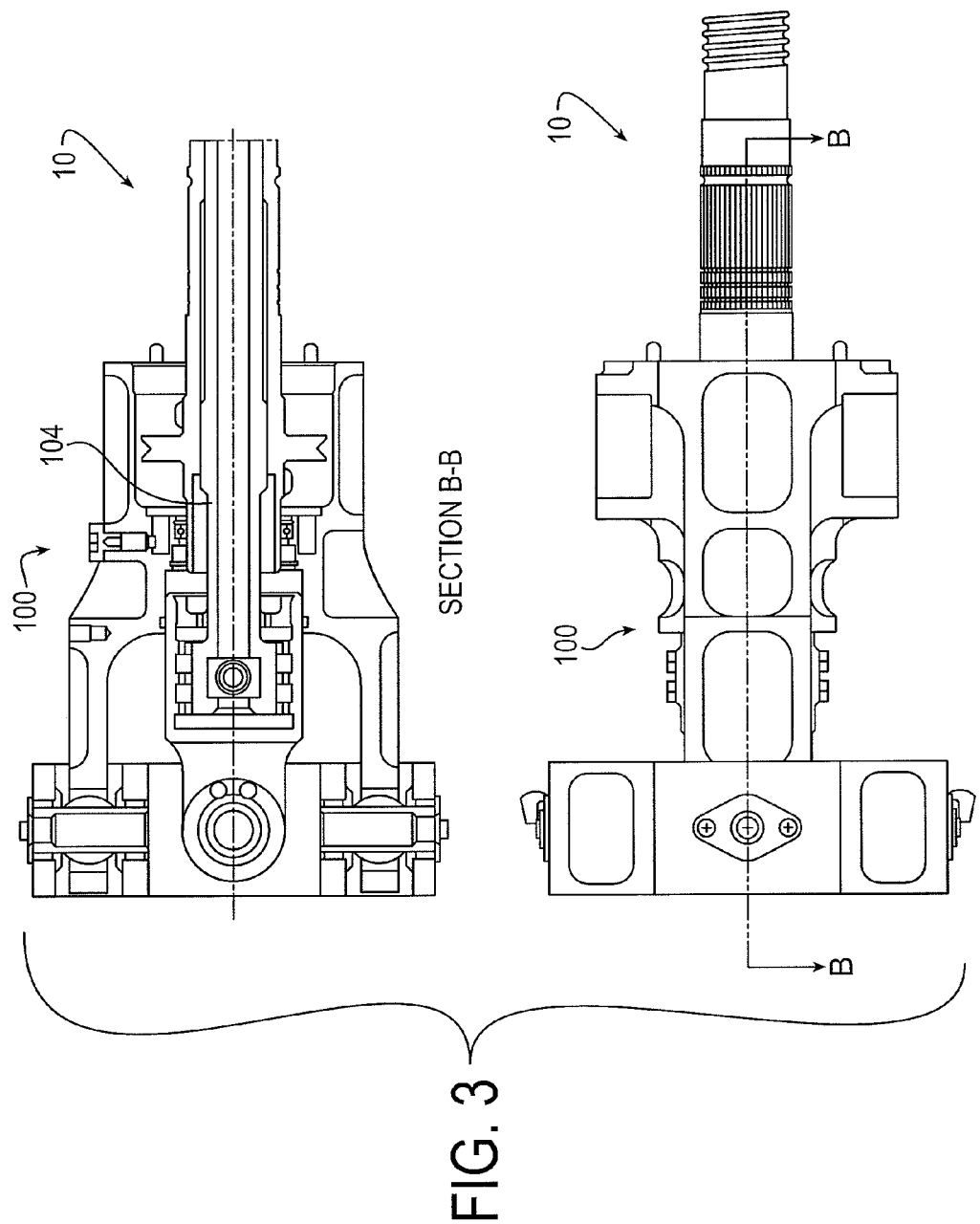
FIG. 3 shows another partial side and partial cross-sectional view of an exemplary actuator.

Turning to FIGS. 2 and 3, an exemplary portion of an actuator 10 is shown in detail and in cross-section. A tie rod assembly 100 may extend along a longitudinal axis 102 and may include a tie rod 104 coupled to a load path locking mechanism 106, shown in more detail in, for example, in FIGS. 4-6. The tie rod and portions of the locking mechanism may be of one piece, or may be otherwise rigidly coupled to each other.

Figure 6:
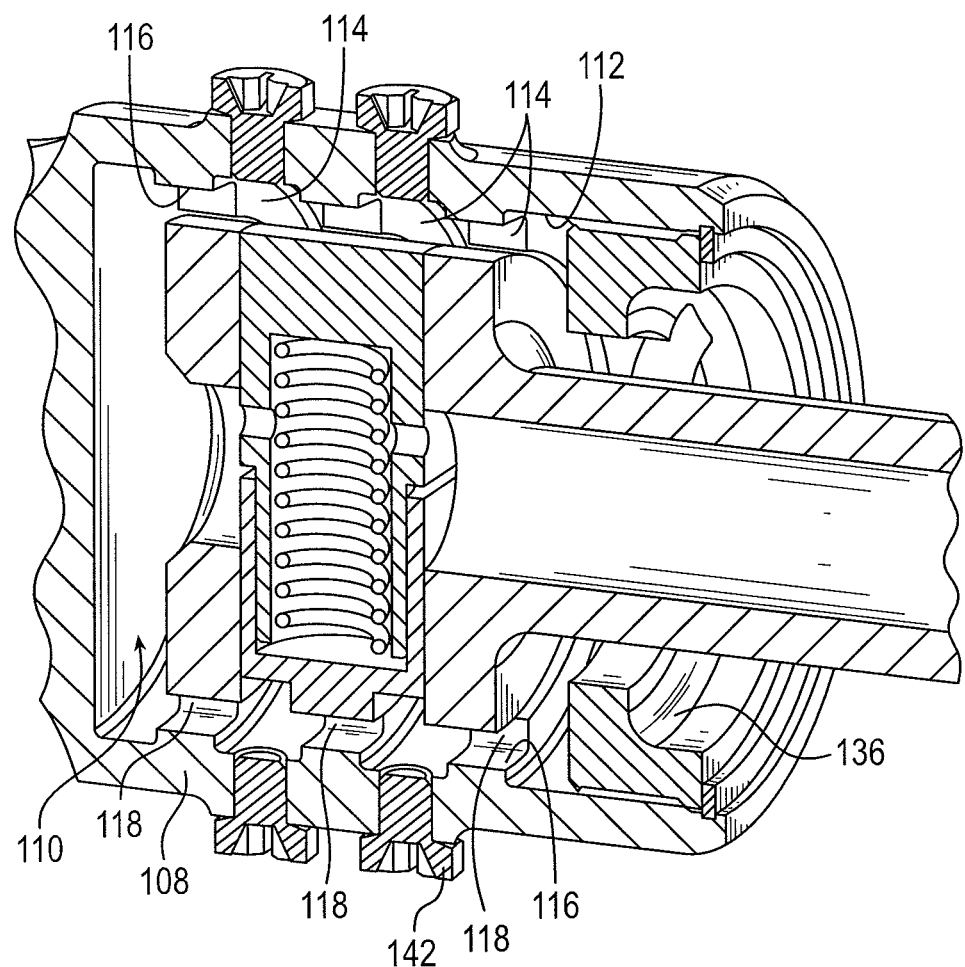
FIG. 6 shows a partial cross-sectional view of an exemplary tie rod assembly.

A lock housing 108 may have a central bore 110 for receiving the tie rod assembly 100 and an inner surface 112 defining the central bore 110 and having at least one protrusion 114 extending radially inward from the inner surface. In the embodiment depicted in FIG. 6, for example, there are three protrusions 114. The protrusions 114 in FIG. 6 are inwardly extending circumferential ribs. Further, the ribs include two oppositely positioned axial slots 116 forming inwardly extending axial ridges 118 across each of the ribs on opposite sides of the lock housing 108. The one or more protrusions 114 need not take this specific structure in order to function. In contrast, any configuration that achieves the objectives set forth herein may be used. However, the configurations described herein are preferred in some situations for their ease of manufacture, their strength, and their capability for high tolerances.

Figure 4:
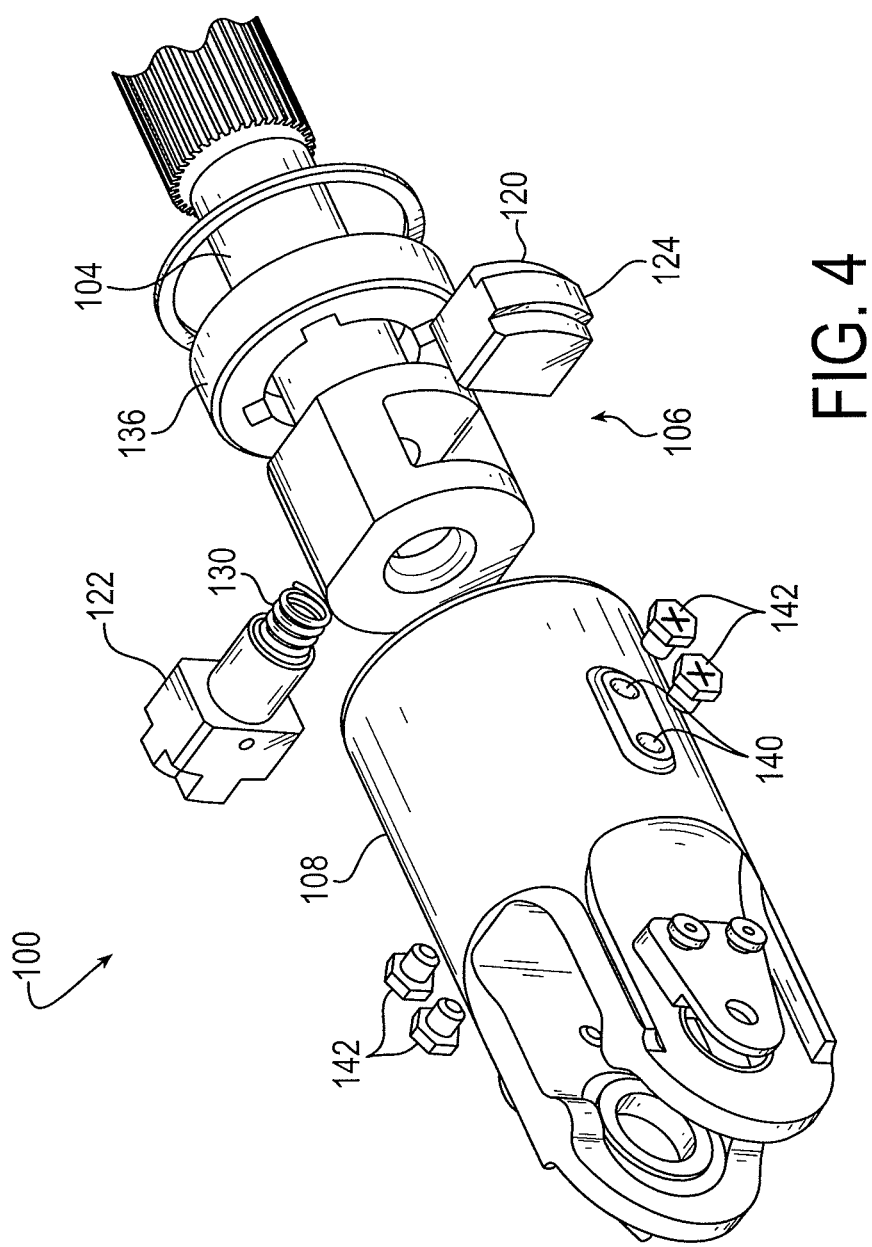
FIG. 4 shows an exploded perspective view of an exemplary tie rod assembly.
Figure 5:
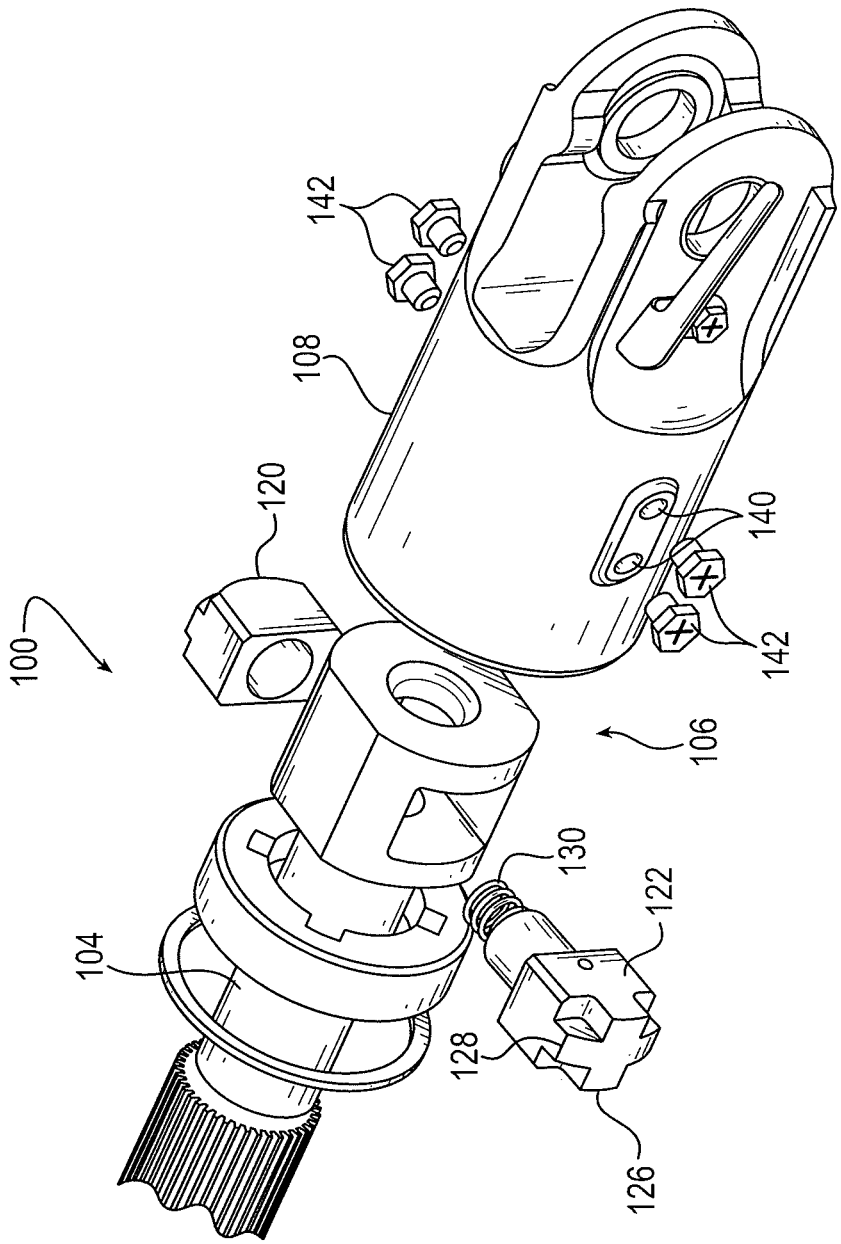
FIG. 5 shows another exploded perspective view of an exemplary tie rod assembly.

FIGS. 4 and 5 show an exploded view of the tie rod assembly 100. The locking mechanism 106 may include one or more segments 120, 122 configured to extend radially outward from a standby position to a failsafe position to prevent relative movement of the tie rod with respect to the lock housing by interacting with at least one protrusion 114.

The embodiment depicted in FIGS. 4 and 5 includes both a latch segment 120 and a lock segment 122. The latch segment 120 may include an outward extending circumferential flange 124 configured to prevent relative axial movement between the tie rod 104 and the lock housing 108 by interacting with the at least one rib 114. The lock segment may have an outward extending axial flange 126 configured to prevent relative radial movement between the tie rod 104 and the lock housing 108 by interacting with the at least one ridge 118. The lock segment may also include an outward extending circumferential flange 128 (thus forming, for example, an outward extending cross-shape in conjunction with the axial flange 126). Although shown with a width less than the width of the entire segment 120, 122, the circumferential and axial flanges may be any appropriate width, and may, for example, be the entire width of the segments 120, 122.

The locking mechanism may further include a spring pack by which to bias the segments, 120, 122 radially outward from a standby position to a failsafe position. For example, a spring 130 contained at least partially within one of the segments, 120 or 122 may provide this biasing force.

The segments 120, 122 may be kept in the standby position simply by means of one of the ribs 114 which prevent the segments from radially extending while the locking mechanism is in a normal operational position.

Figure 7:
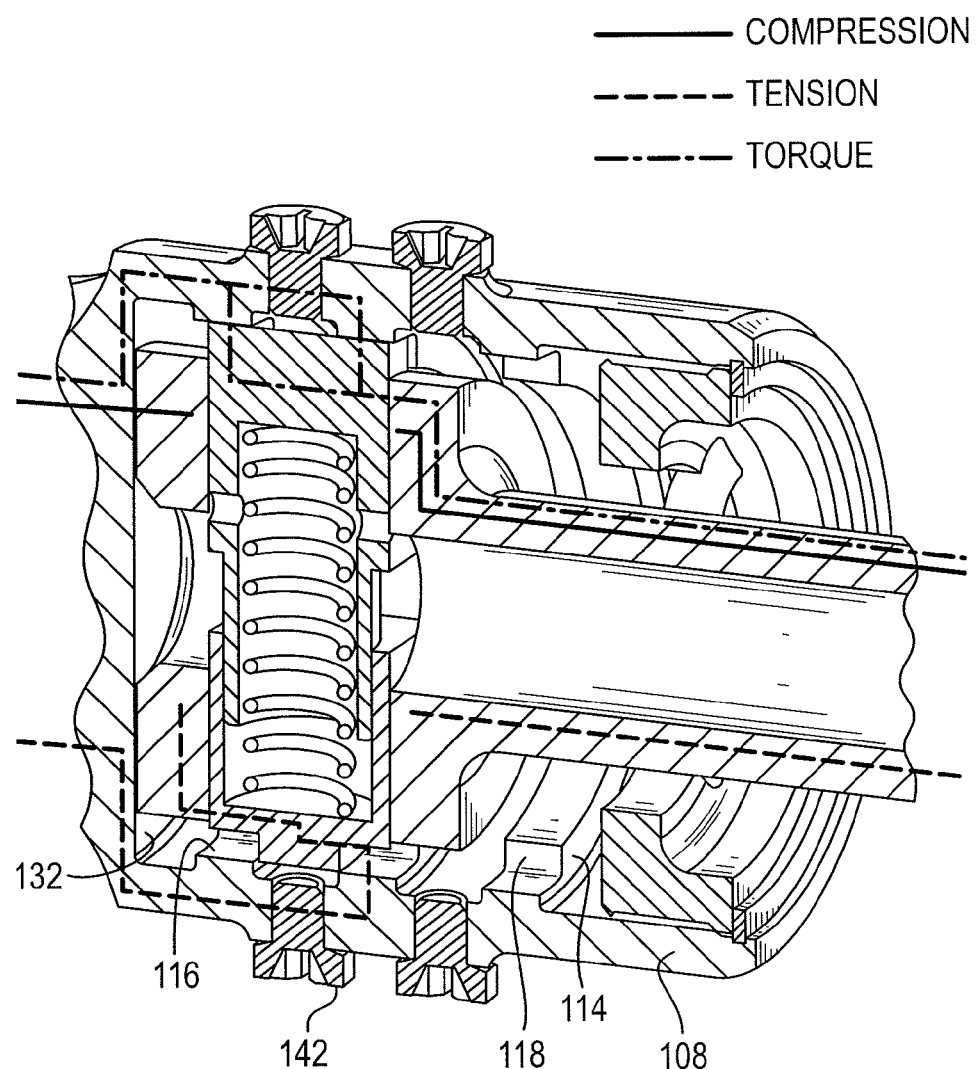
FIG. 7 shows a partial cross-sectional view of an exemplary tie rod assembly after a compressive failure with various load paths illustrated.
Figure 8:
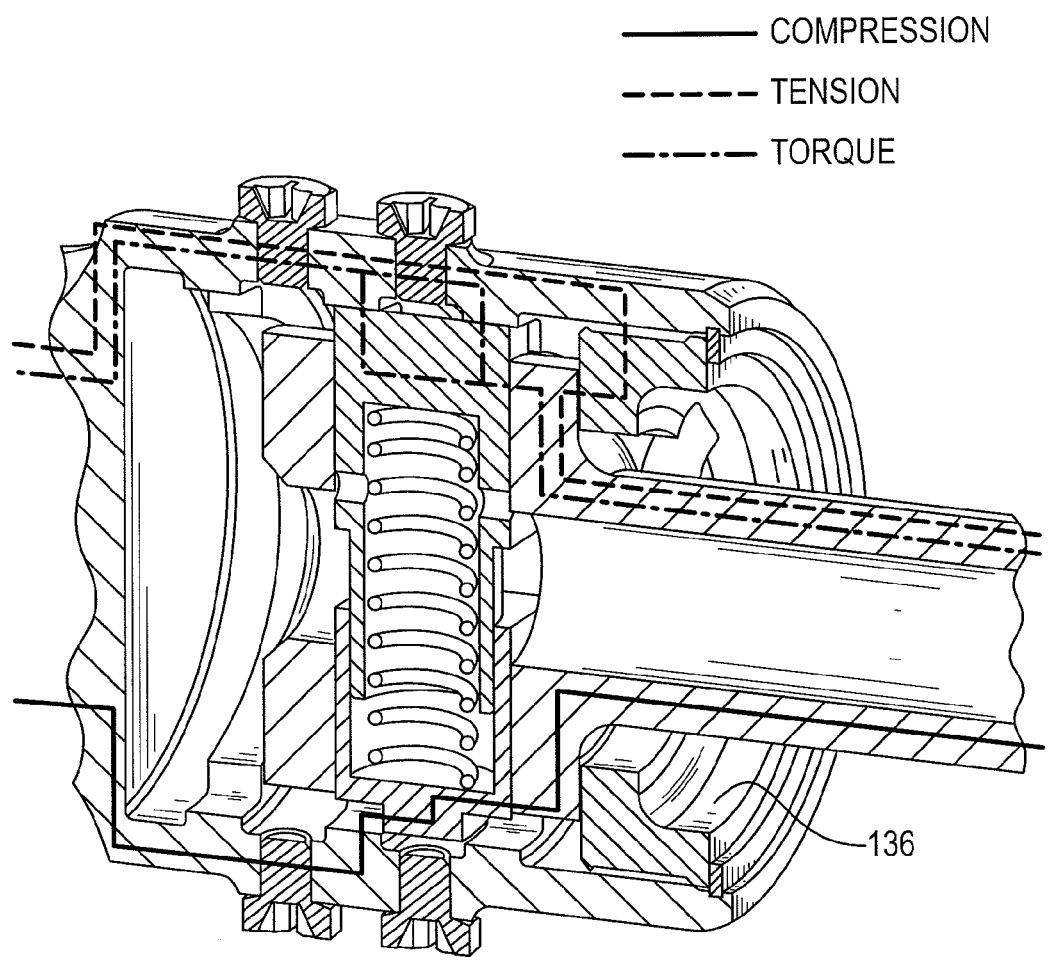
FIG. 8 shows a partial cross-sectional view of an exemplary tie rod assembly after a tension failure with various load paths illustrated.

Turning now to FIGS. 7 and 8, shown is a cross-sectional view of the lock housing and locking mechanism depicting the secondary load paths in both a compressive failure and tension failure.

FIG. 7 shows the operation of the secondary load path in a compressive failure. If the primary load path compressively fails, the locking mechanism moves axially into the lock housing 108. The biasing means actuates the latch segment 120, which radially extends the circumferential flange 124 between the inner and middle ribs 114. (In an embodiment with only one rib, for example, the latch segment 120 may extend to the inner side of the rib). Once actuated, the latch segment forms a secondary load path with the middle rib when under tension loads. Compression loads cause the locking mechanism to form a secondary load path with the back wall 132 of the lock housing 108 and/or the innermost rib 114.

In contrast, FIG. 8 shows the operation of the secondary load path in a tension failure. If the primary load path fails under a tension load, the locking mechanism moves axially towards the opening of the bore of the lock housing 108. The biasing means actuates the latch segment 120, which radially extends the circumferential flange 124 between the outer and middle ribs 114. (In an embodiment with only one rib, for example, the latch segment 120 may extend to the outer side of the rib). Once actuated, the latch segment 120 forms a secondary load path with the middle rib when under compression loads. Tension loads cause the locking mechanism to form a secondary load path with a threaded retainer 136 and/or the outermost rib 114.

In either case, preferably, the amount of angular displacement of the actuated surface 12 before the latch segment 120 engages is 0.3 degrees or less. Furthermore, the amount of freeplay that the surface 12 is allowed once the latch segment 120 moves into the failsafe position is less than 0.025 degrees. The present invention is particularly effective in meeting these preferences.

Upon a trim command by the control unit 35, the tie rod rotates. Within 180 degrees, the lock segment 122 engages by extending radially outward and moving into the failsafe position. The axial flange may then engage with at least a portion of the axial ridge(s) 118 by moving into the slot 116. This engagement will prevent further rotation of the tie rod and annunciate failure of the primary load path. The axial flange 126 will form a secondary load path with the axial ridge 118 under torque loads, as is depicted in FIGS. 7 and 8.

Figure 9:
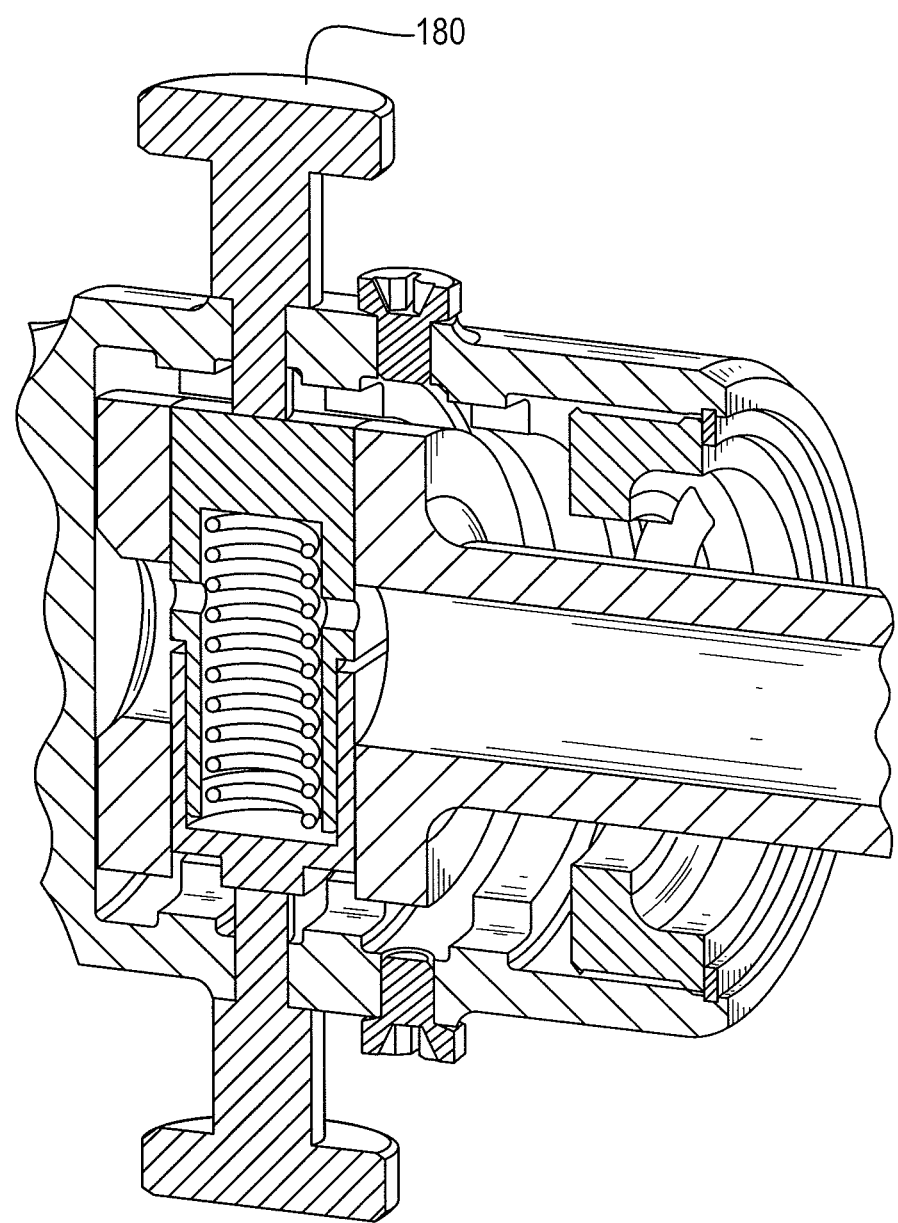
FIG. 9 shows a partial cross-sectional view of an exemplary tie rod assembly with reset tools inserted after a compressive failure.
Figure 10:
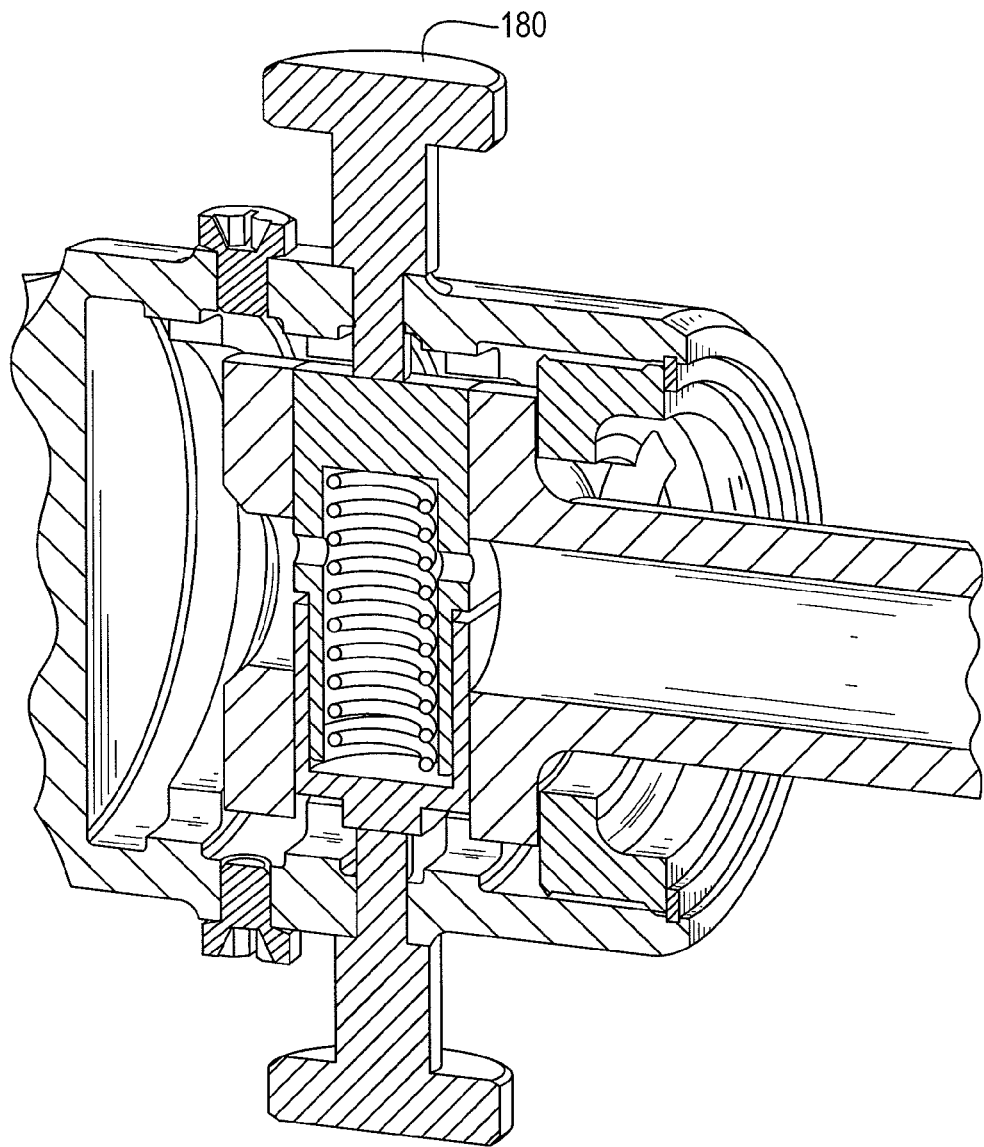
FIG. 10 shows a partial cross-sectional view of an exemplary tie rod assembly with reset tools inserted after a tension failure.

The lock housing 108 may further include one or more radial ports adjacent to the rib 114 thereby allowing access to reset the locking mechanism from the failsafe position to the standby position. In one embodiment, there is a port located between each adjacent pair of ribs 114 at the location of the slots 116. For Example, FIGS. 9 and 10 show four ports 140—a pair each on opposite sides of the lock housing 108. The left, or inner, pair allow access to the segments 120, 122 after a compression failure (or test) and shown in FIG. 9. Alternatively, the right, or outer, ports allow access to the segments 120, 122 after a tension failure (or test). The ports 140 may each be covered with a plug 142 (for example, a screw) when not being accessed for resetting the locking mechanism.

Beyond providing easier access for resetting the locking mechanism after a failure than known designs, the ports 140 also allow ease of testing the secondary load path. In order to test the secondary load path, the lower primary load path gimbal pin may be removed to simulate a primary load path failure. A compression or tension load may then be applied, depending on which function is being tested, via, for example, some ground support equipment, and then the actuator is operated to engage the locking mechanism. In order to reset the mechanism, the two appropriate plugs are removed from the lock housing (as depicted in FIGS. 9 and 10), and reset tools 180 are pushed into the lock housing to push the latch and lock segments out of engagement with the protrusions. In one embodiment, the tools 180 may be threaded into the lock housing for increased leverage and control. Next, a load opposite from the simulated failure load is applied, for example, by ground support equipment, and the lower primary load path gimbal pin is reinstalled. Finally, the reset tools 180 may be removed from the lock housing and the plugs reinstalled. The same or similar testing and resetting method may be used in other configurations, described herein, or otherwise.

Turning now to FIGS. 11-23, an exemplary embodiment of the tie rod assembly is shown at 200. The tie rod assembly 200 is substantially the same as the above-referenced tie rod assembly 100, and consequently the same reference numerals but indexed by 100 are used to denote structures corresponding to similar structures in the tie rod assembly. In addition, the foregoing description of the tie rod assembly 100 is equally applicable to the tie rod assembly 200 except as noted below. Moreover, it will be appreciated upon reading and understanding the specification that aspects of the tie rod assemblies may be substituted for one another or used in conjunction with one another where applicable.

Figure 11:
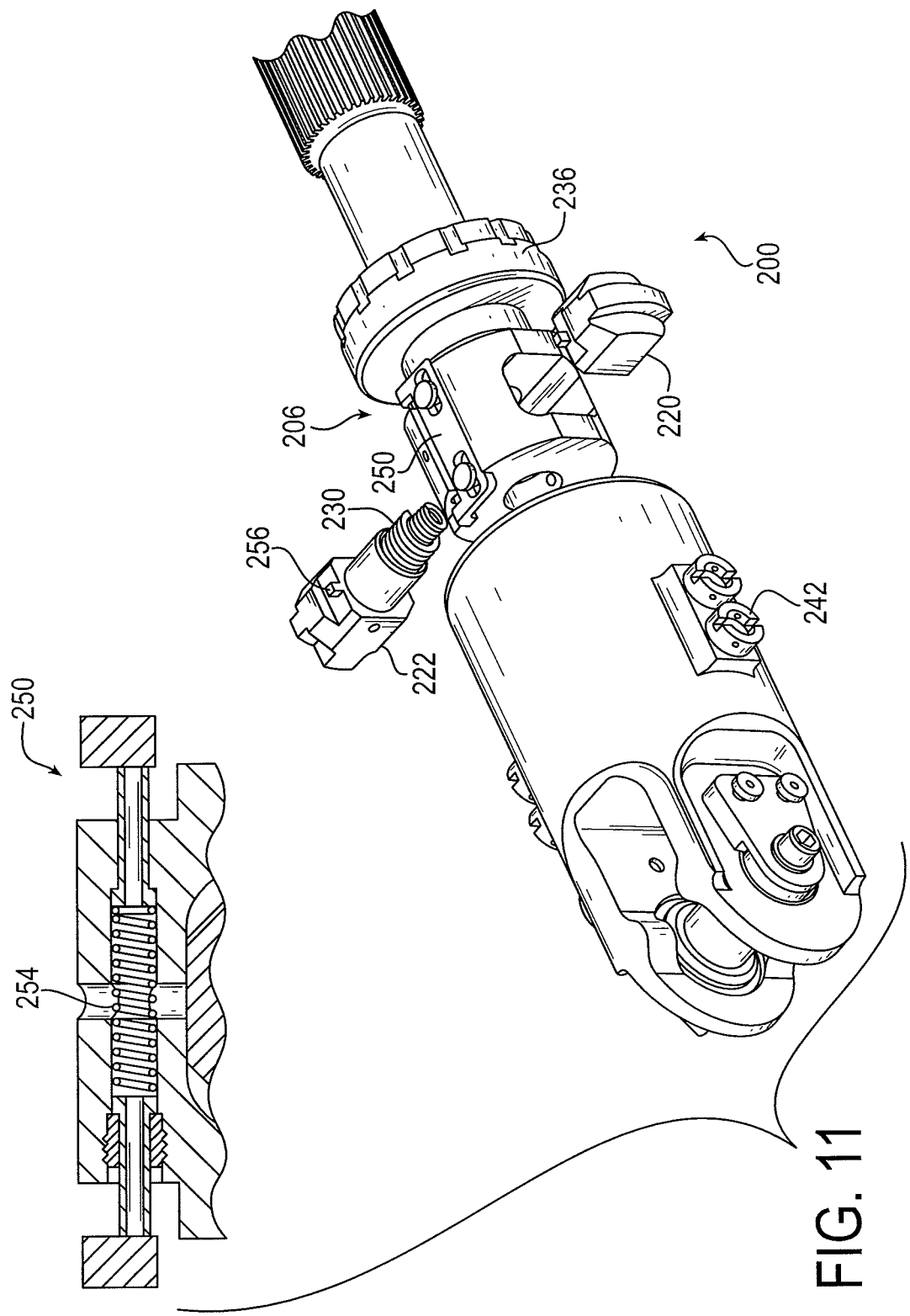
FIG. 11 shows a detail cross-sectional view of a trigger mechanism and a partial exploded perspective view of an exemplary tie rod assembly including a trigger mechanism.
Figure 12:
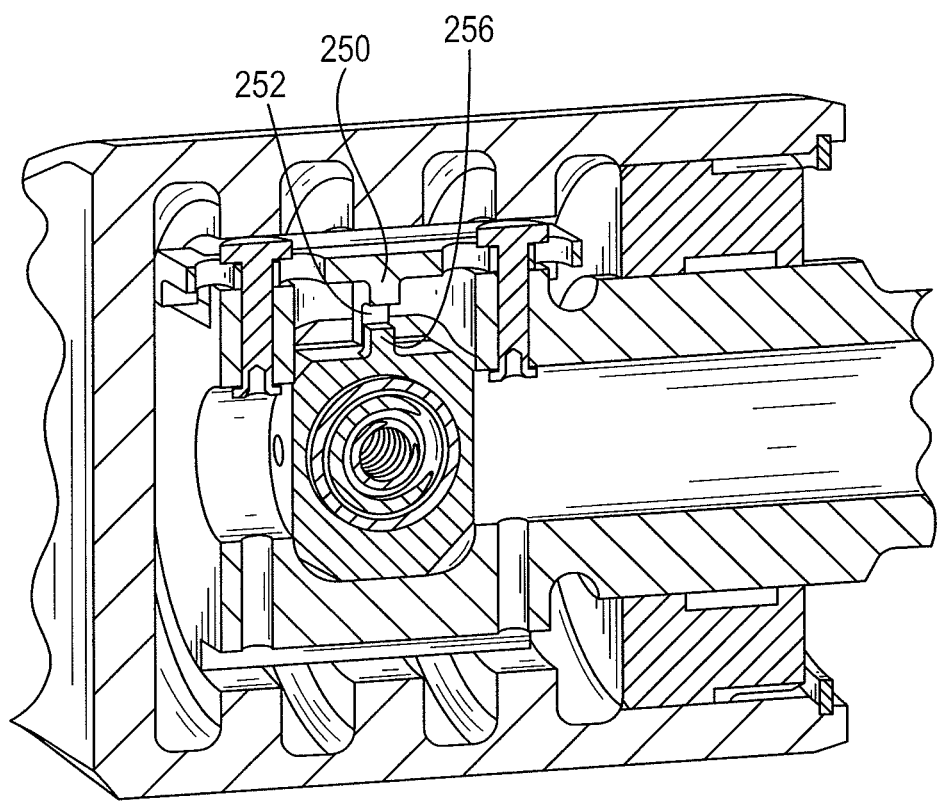
FIG. 12 shows a partial perspective cross-sectional view of an exemplary tie rod assembly.
Figure 13:
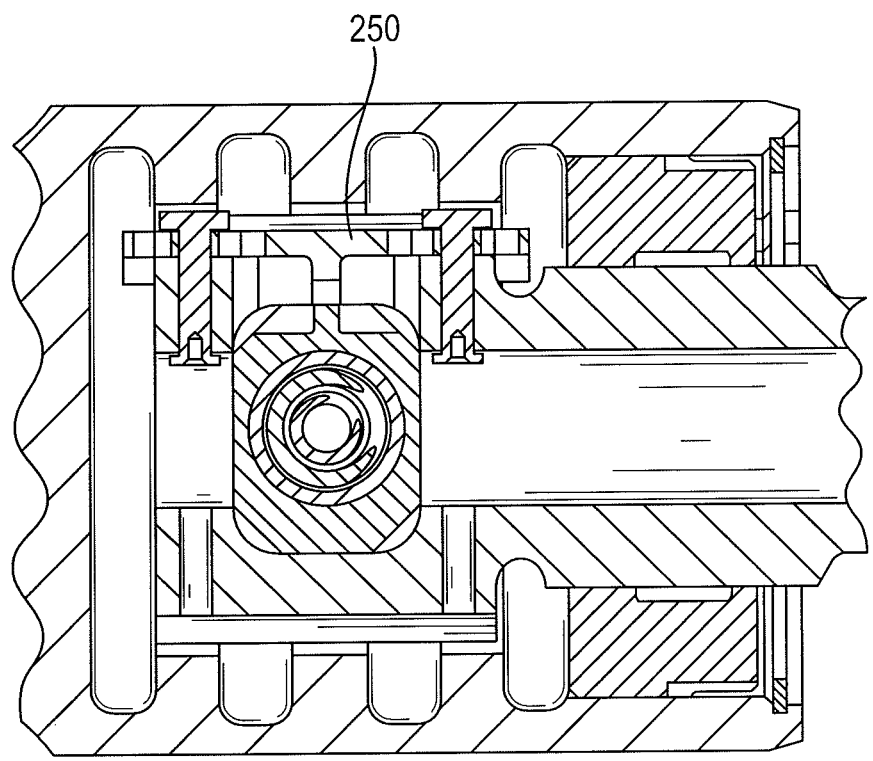
FIG. 13 shows a partial side cross-sectional view of an exemplary tie rod assembly.
Figure 14:
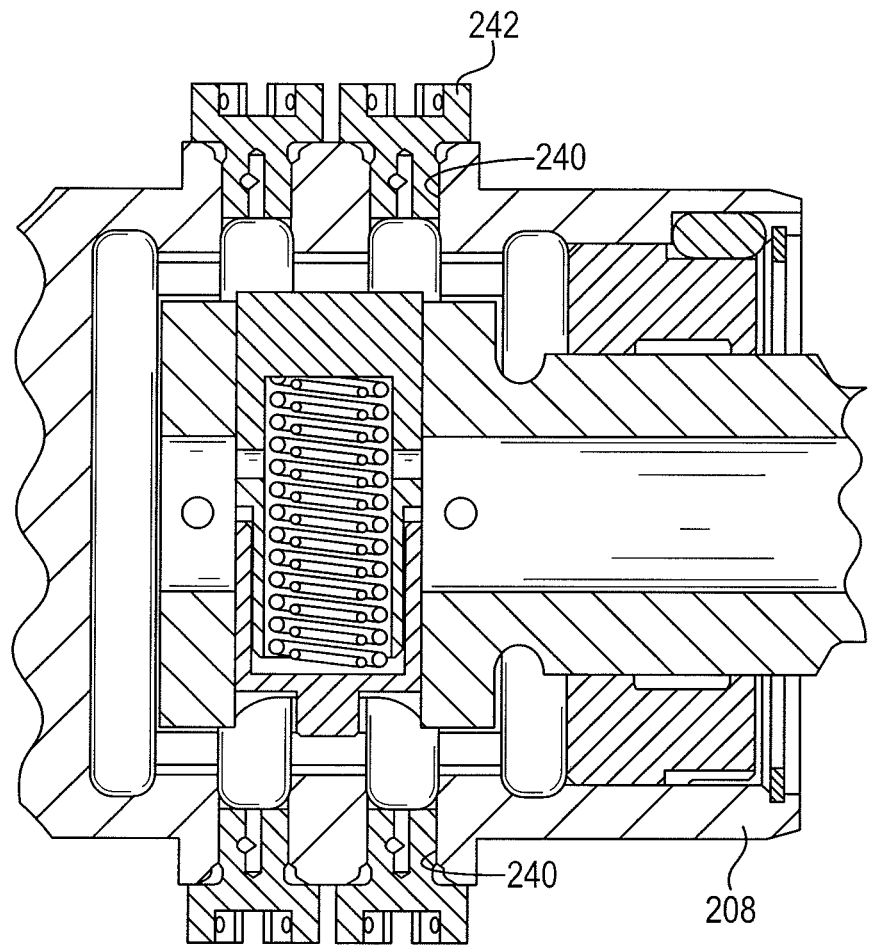
FIG. 14 shows another partial side cross-sectional view of an exemplary tie rod assembly.
Figure 15:
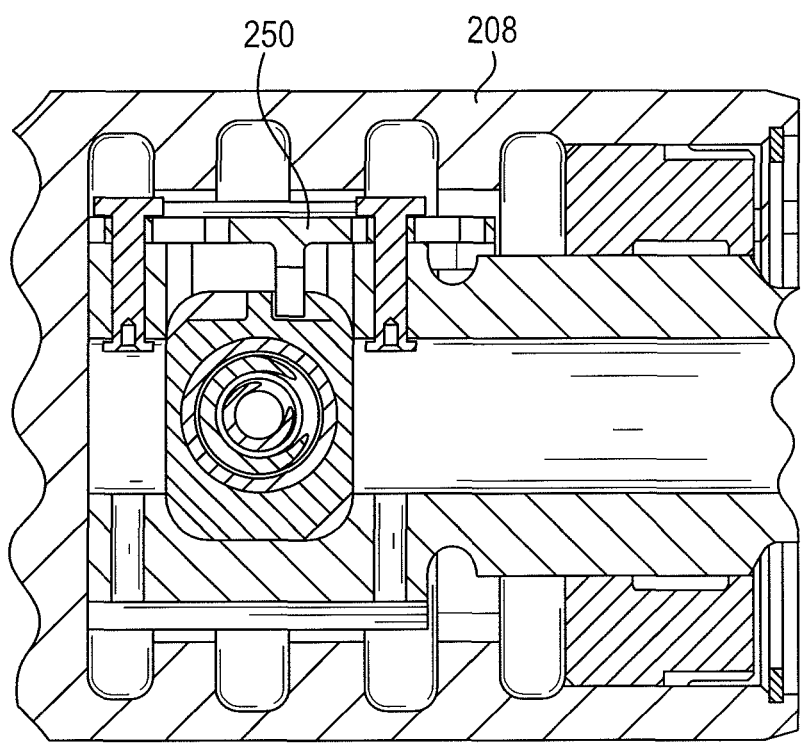
FIG. 15 shows a partial side cross-sectional view of an exemplary tie rod assembly after a compressive failure.
Figure 16:
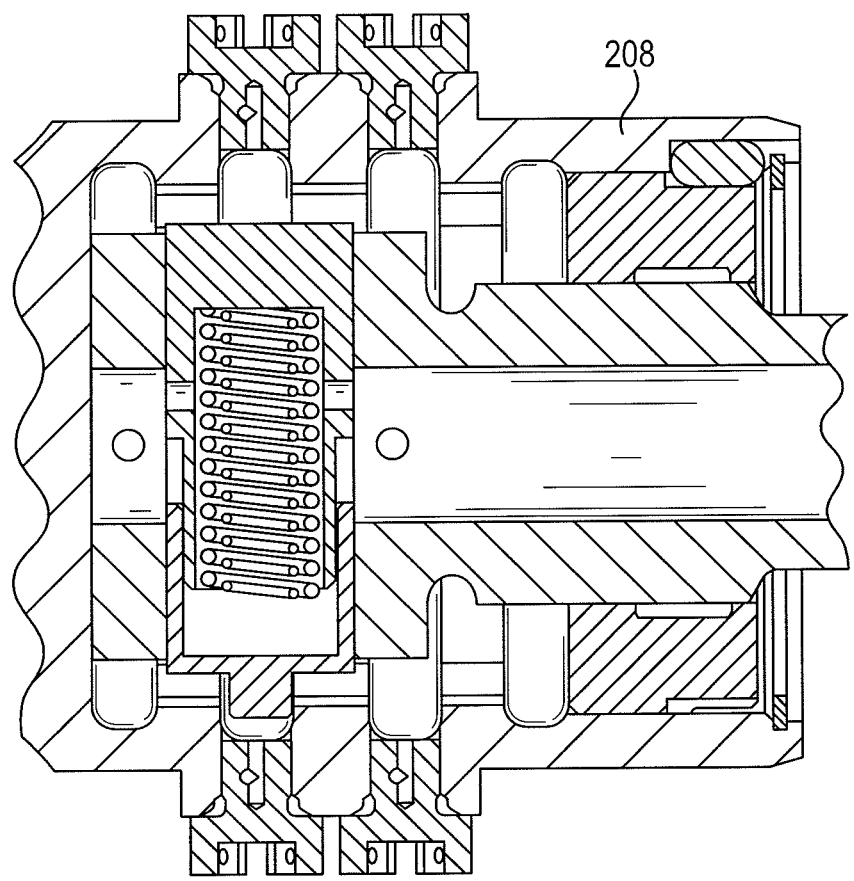
FIG. 16 shows another partial side cross-sectional view of an exemplary tie rod assembly after a compressive failure.
Figure 17:
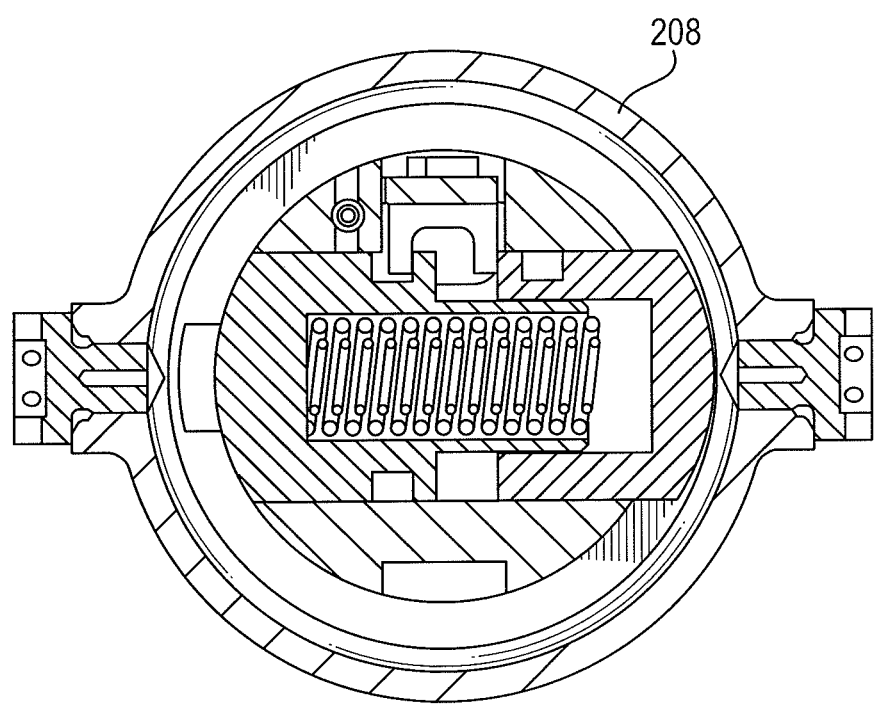
FIG. 17 shows an axial cross-sectional view of an exemplary tie rod assembly after a compressive failure.
Figure 18:
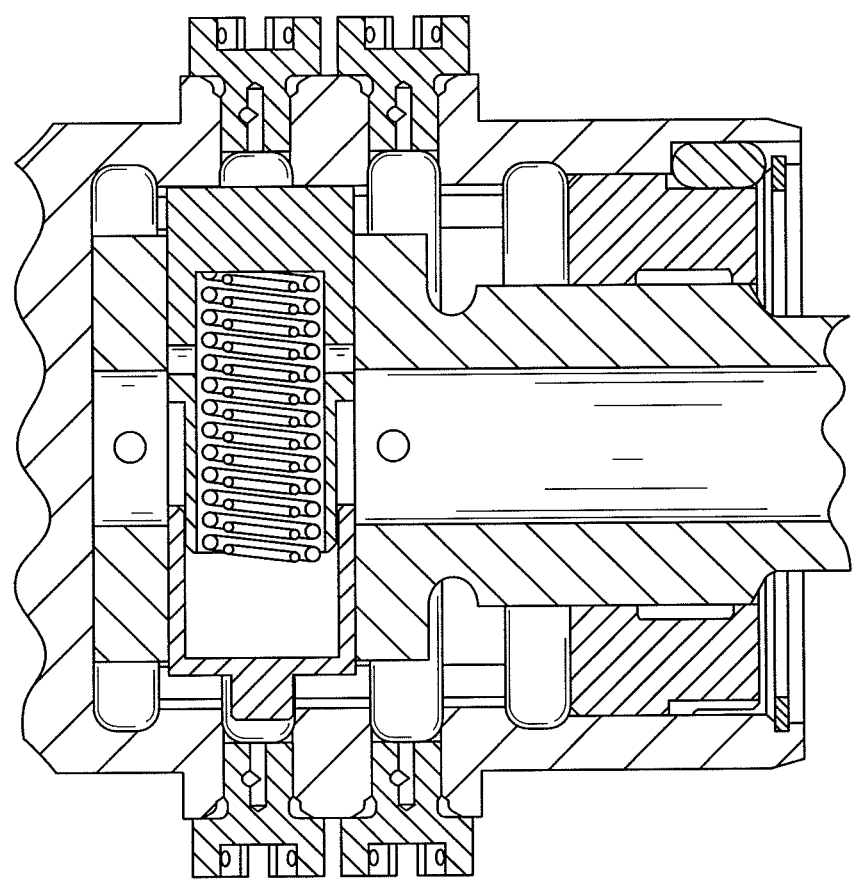
FIG. 18 shows a partial side cross-sectional view of an exemplary tie rod assembly after a compressive failure and a trim command.
Figure 19:
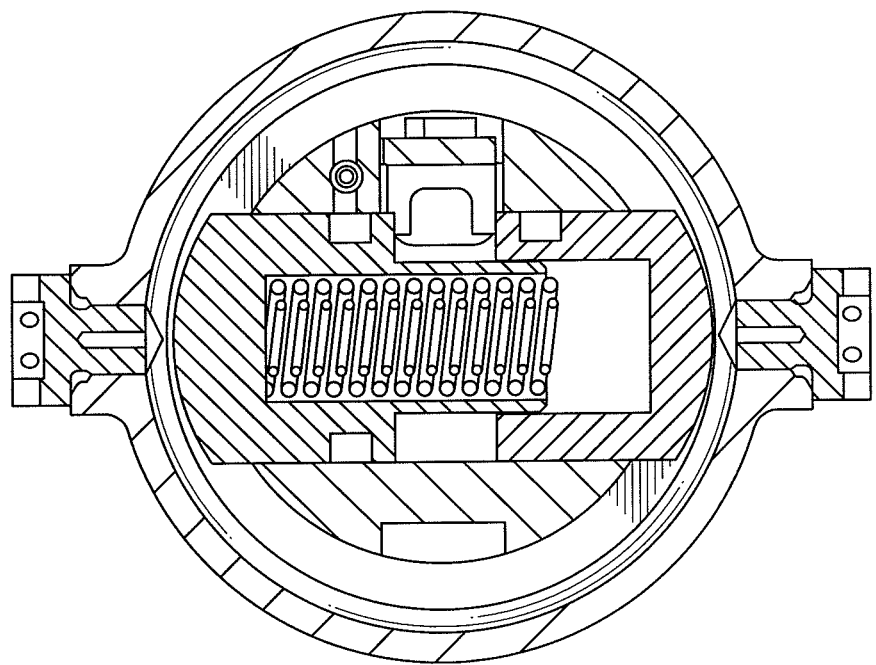
FIG. 19 shows an axial cross-sectional view of an exemplary tie rod assembly after a compressive failure and a trim command.
Figure 20:
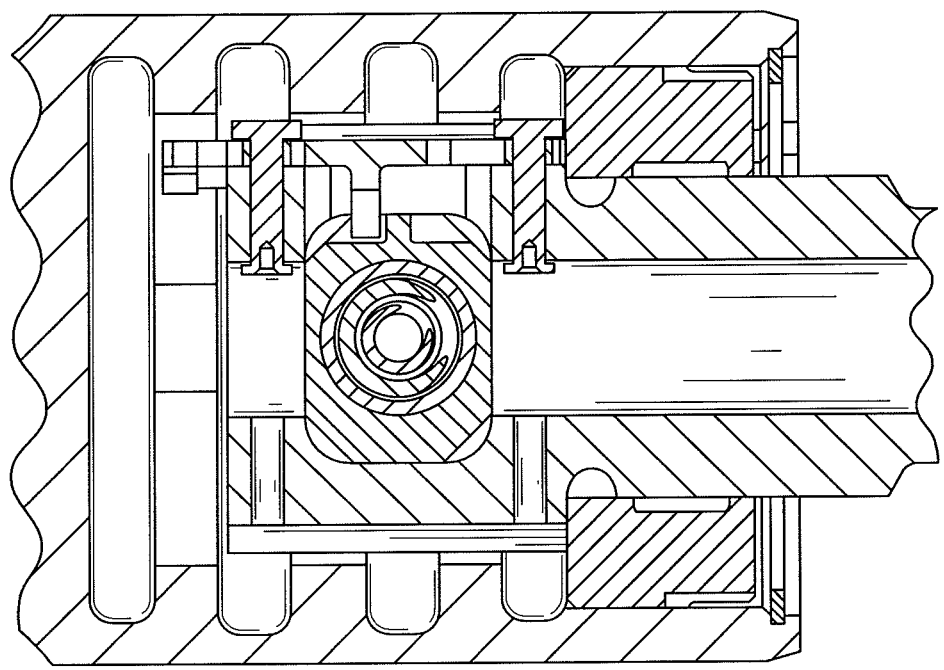
FIG. 20 shows a partial side cross-sectional view of an exemplary tie rod assembly after a tension failure.
Figure 21:
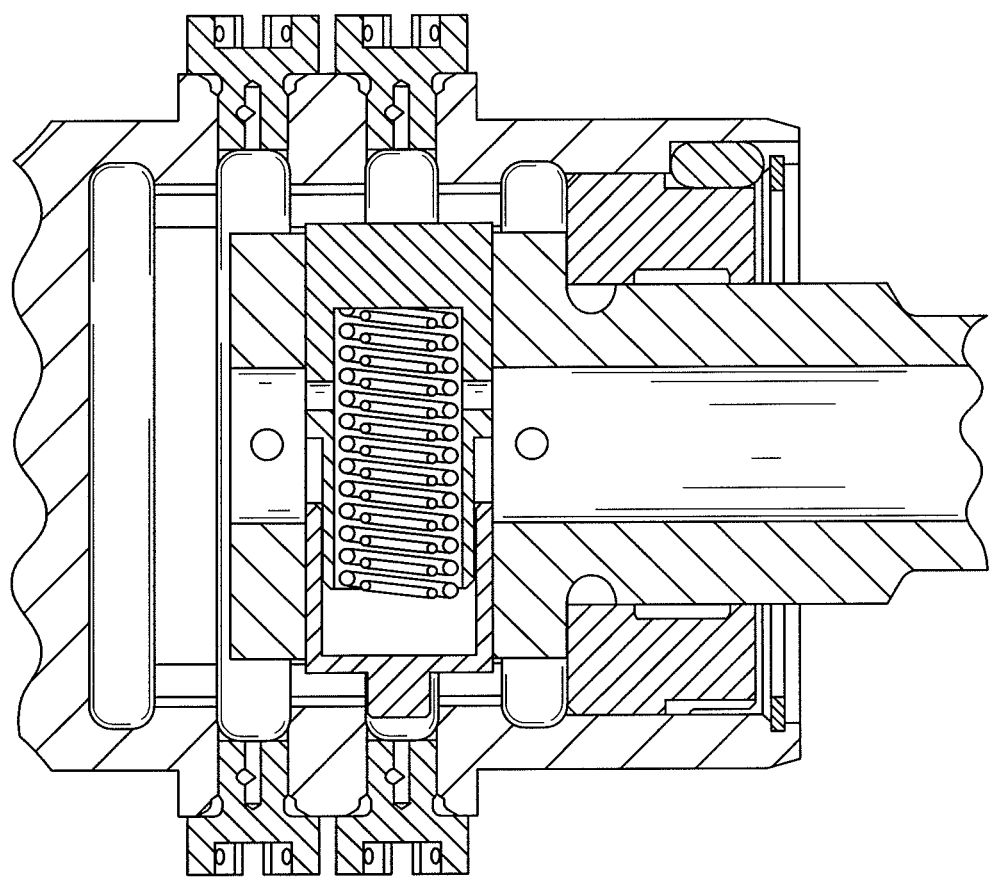
FIG. 21 shows another partial side cross-sectional view of an exemplary tie rod assembly after a tension failure.
Figure 22:
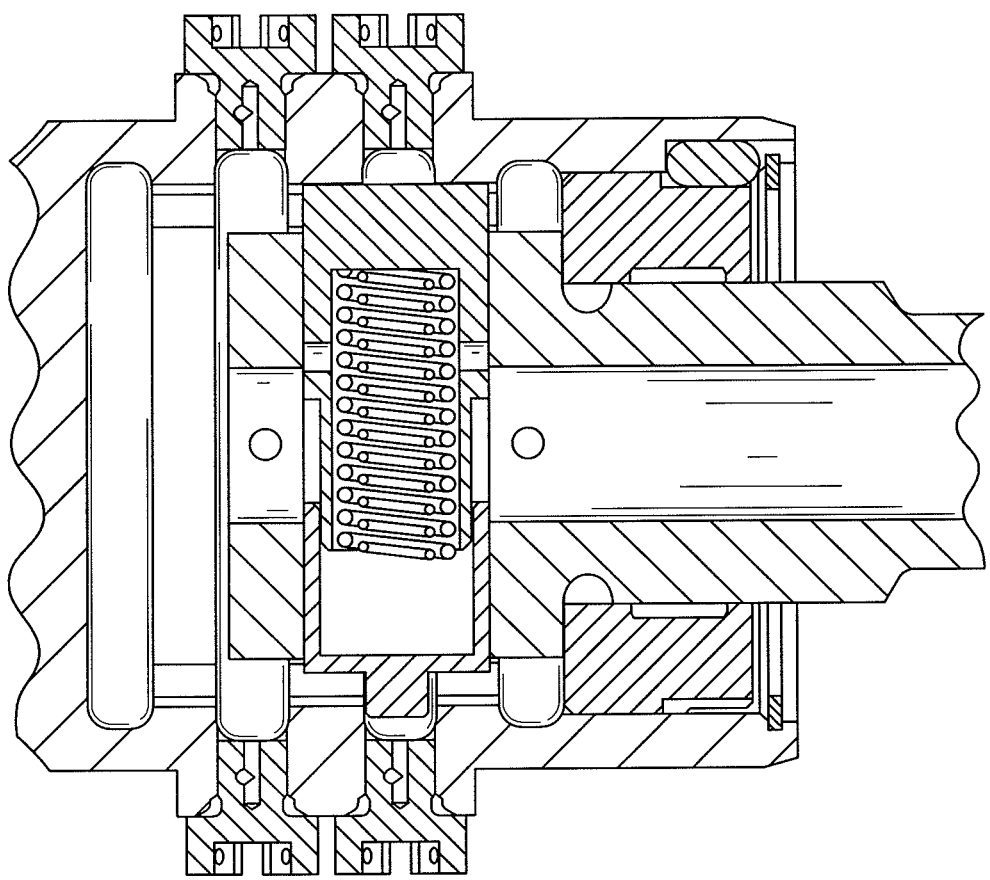
FIG. 22 shows a partial side cross-sectional view of an exemplary tie rod assembly after a tension failure and a trim command.
Figure 23:
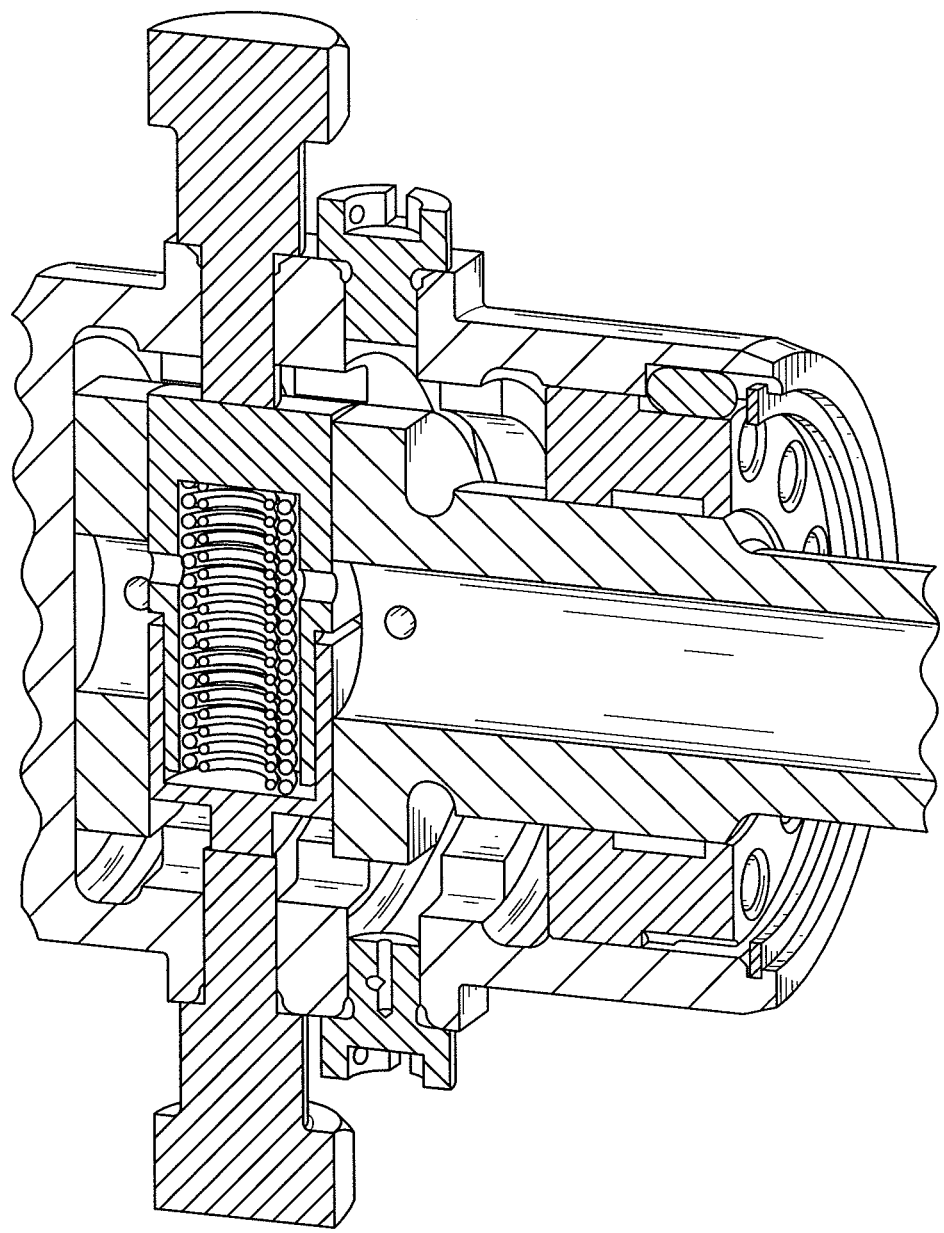
FIG. 23 shows a partial cross-sectional view of an exemplary tie rod assembly with reset tools inserted after a compressive failure.

As most clearly shown in FIG. 11, the locking mechanism 206 may include a trigger mechanism 250 configured to trigger outward extension of the segments 220, 222 to the failsafe position when the primary load path fails. The trigger mechanism may be attached to the rest of the locking mechanism 250 by any suitable means, for example a pair of axially spaced rivets. Although other configurations are possible and within the scope of the present invention, the trigger mechanism may be axially displaceable with respect to the segments 220, 222, thereby allowing a trigger latch 252 (shown in FIG. 12) to release the segments 220, 222. The trigger mechanism may include a centering spring 254 which biases the trigger mechanism towards a central reset position to hold the segments 220, 222 in the standby position.

During a compressive failure (shown in FIGS. 15-17), the locking mechanism will be pushed further into the lock housing 208. Therefore, the trigger mechanism 250, which may axially extend beyond the remainder of the locking mechanism 206, may be pressed against the end of the axial bore on the inside of the lock housing 208 and shift axially with respect to the segments 220, 222. The segments 220, 222, may include some projection or recess such as, for example, hooks 256 that are caught and latched by the trigger latch 252 when in a standby position.

During a tension failure (shown in FIGS. 20-22), the locking mechanism will be pushed towards the open end of the lock housing 208. Therefore, the trigger mechanism 250, which may axially extend beyond the remainder of the locking mechanism 206, may be pressed against the threaded retainer 236, closing the open end of the axial bore of the lock housing 208, and shift axially with respect to the segments 220, 222.

The test and resetting method for the present embodiment (shown, for example, in FIG. 23) is identical to the previous one, except that, when the segments 220, 222 are depressed and the locking mechanism 206 is reset towards the center of the lock housing 208, the trigger mechanism automatically resets itself via the centering spring 254.

Further, the spring pack 230 may include an inner spring having a first handedness and a coaxial outer spring having a second handedness opposite the first handedness. This redundancy will result in fewer failures of the locking mechanism, and having the springs of opposite handedness will prevent the springs from binding with each other.

Figure 24:
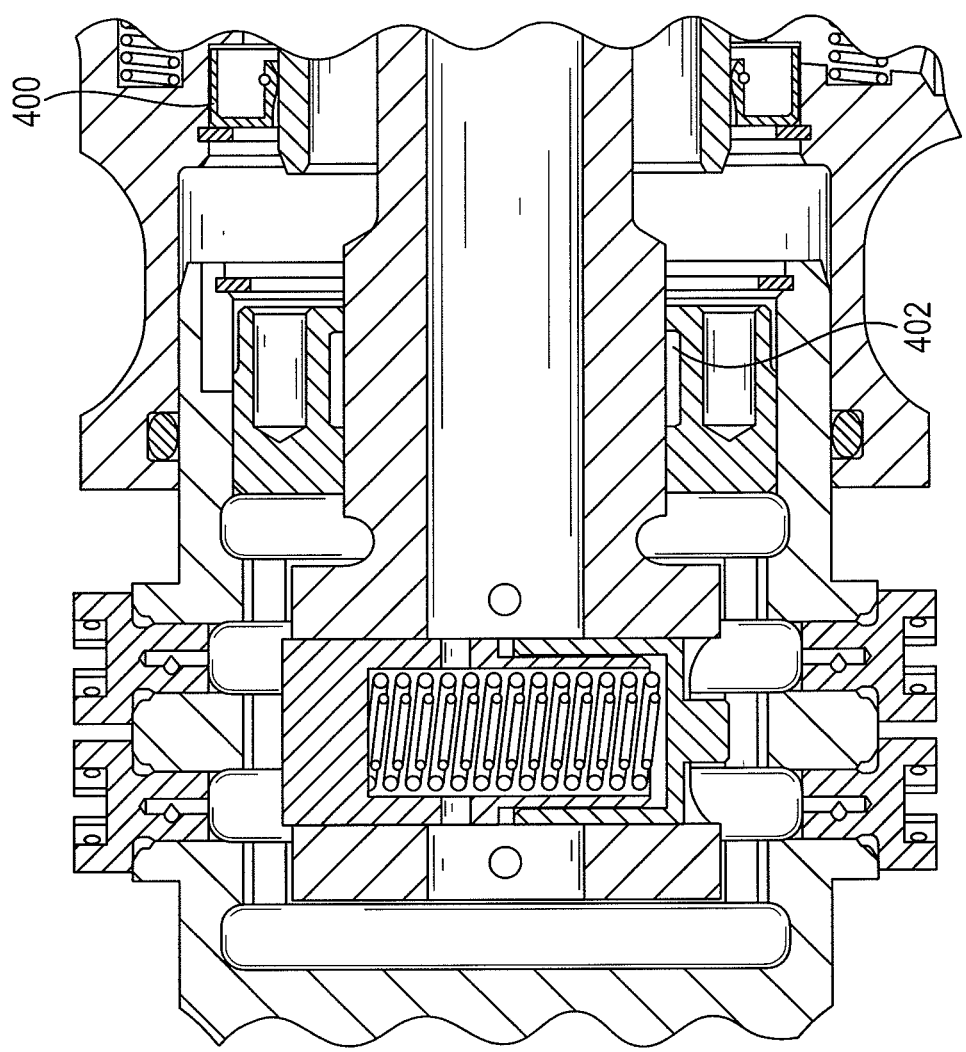
FIG. 24 shows a partial cross-sectional view of an exemplary tie rod assembly including seal elements.

FIG. 24 shows a cross-section of an assembled tie rod assembly including o-ring seals for keeping in grease, such as, for example, Aeroshell 33 grease in the lock housing and Castrol Aero 40 oil outside the dynamic rotary seal 400. A slydring 402 positioned between the threaded retainer and the tie rod radially guides the threaded rod through the threaded retainer.

Figure 25:
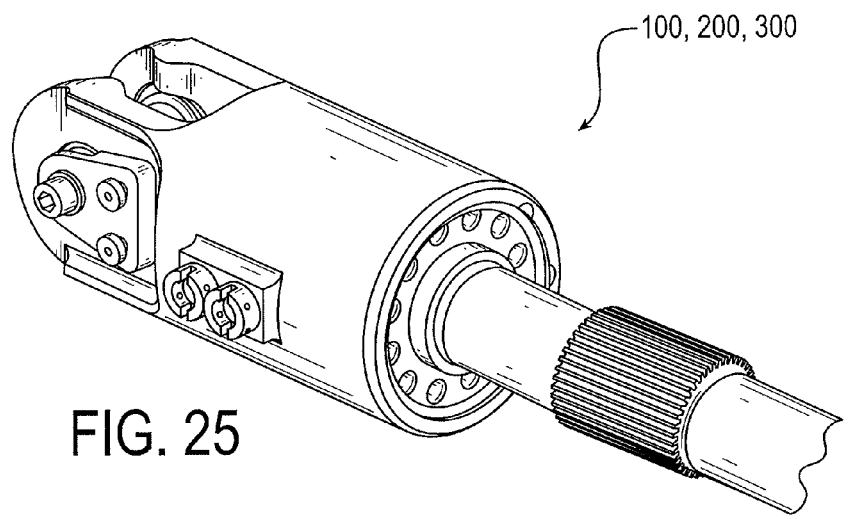
FIG. 25 shows an assembled perspective view of an exemplary tie rod assembly.
Figure 26:
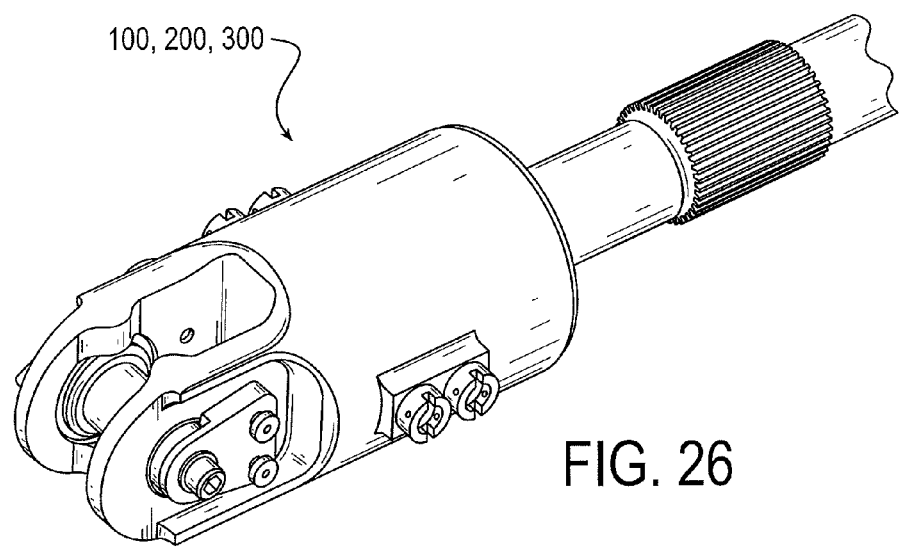
FIG. 26 shows another assembled perspective view of an exemplary tie rod assembly.
Figure 27:
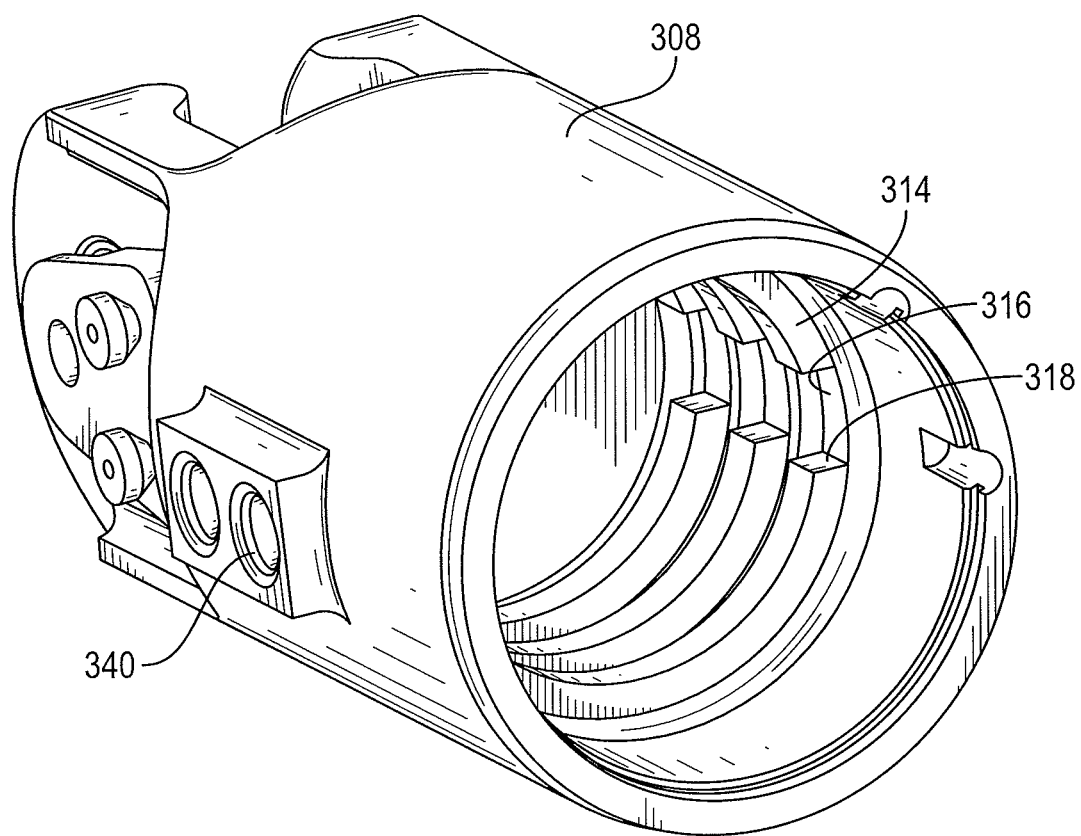
FIG. 27 shows a perspective view of an exemplary lock housing.
Figure 28:
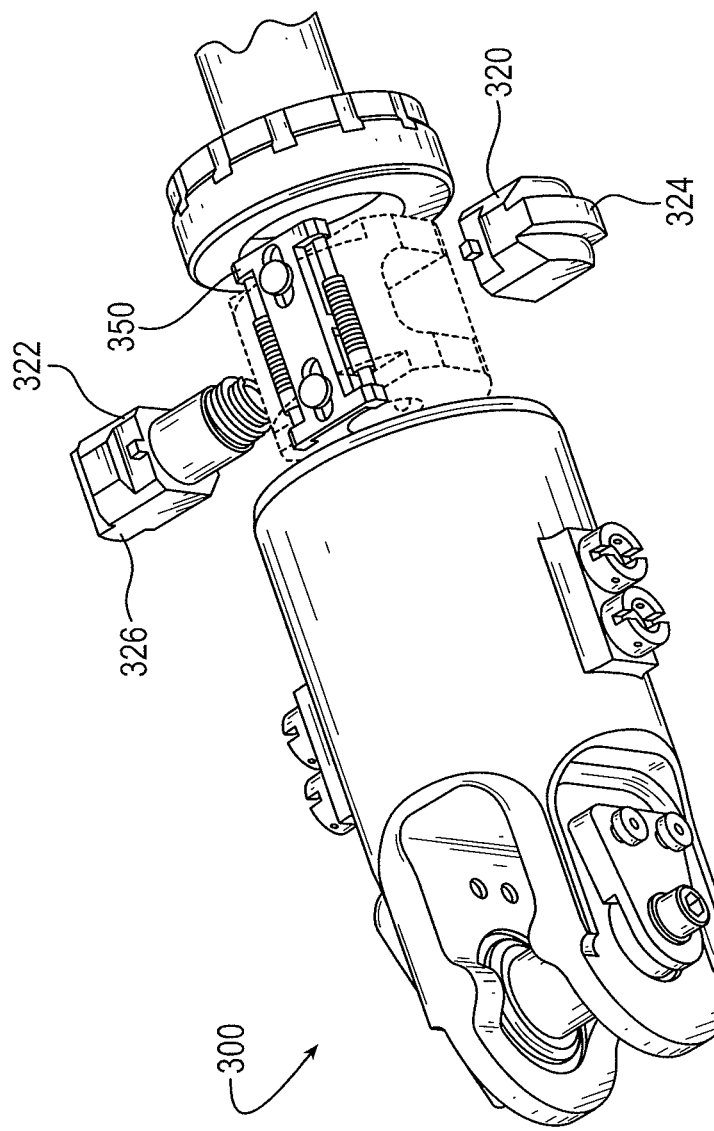
FIG. 28 shows an exploded perspective view of an exemplary tie rod assembly having a trigger mechanism with redundant centering springs.
Figure 29:
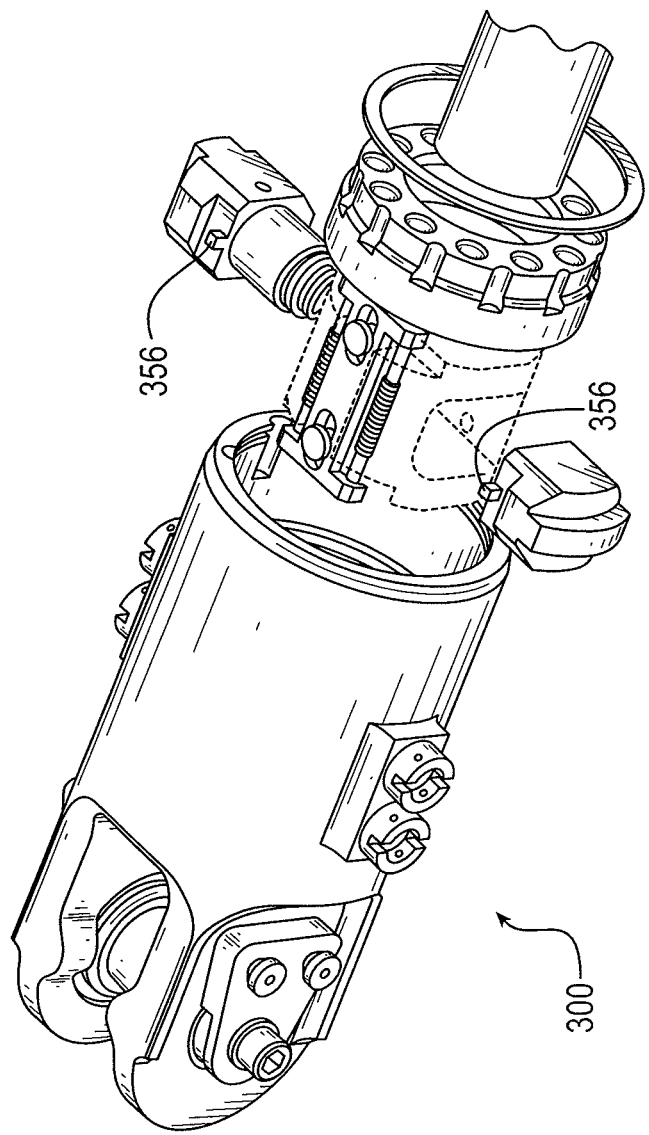
FIG. 29 shows another exploded perspective view of an exemplary tie rod assembly having a trigger mechanism with redundant centering springs.
Figure 30:
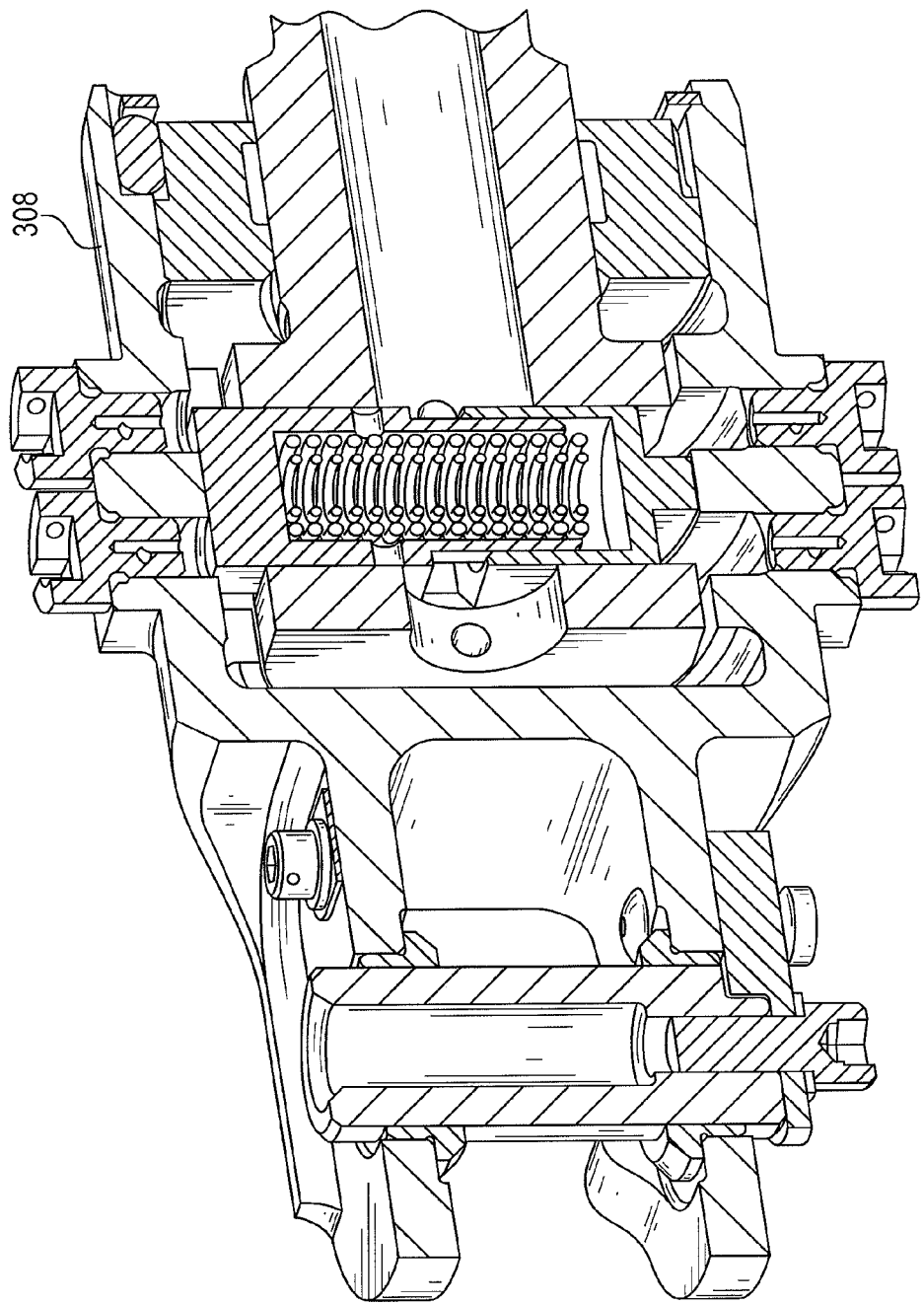
FIG. 30 shows a partial cross-sectional view of an exemplary tie rod assembly.
Figure 31:
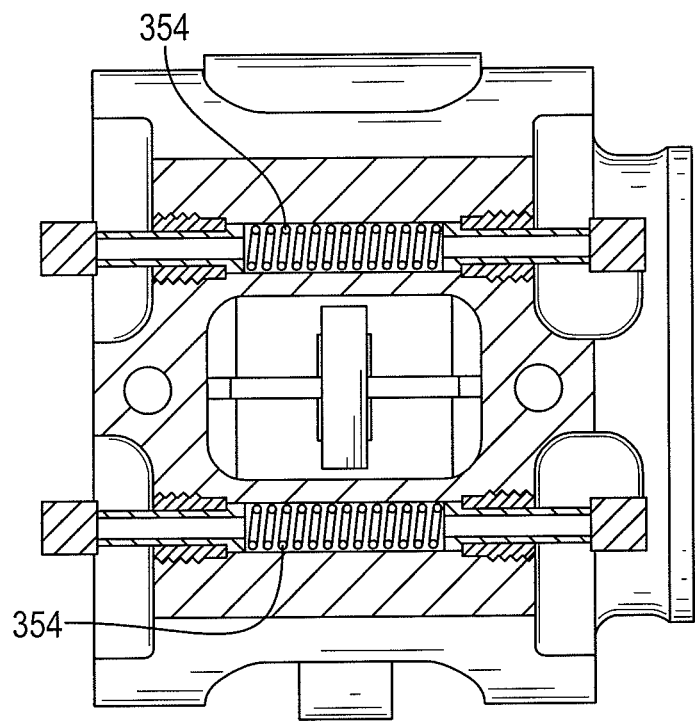
FIG. 31 shows a detail view of a trigger mechanism having redundant centering springs.
Figure 32:
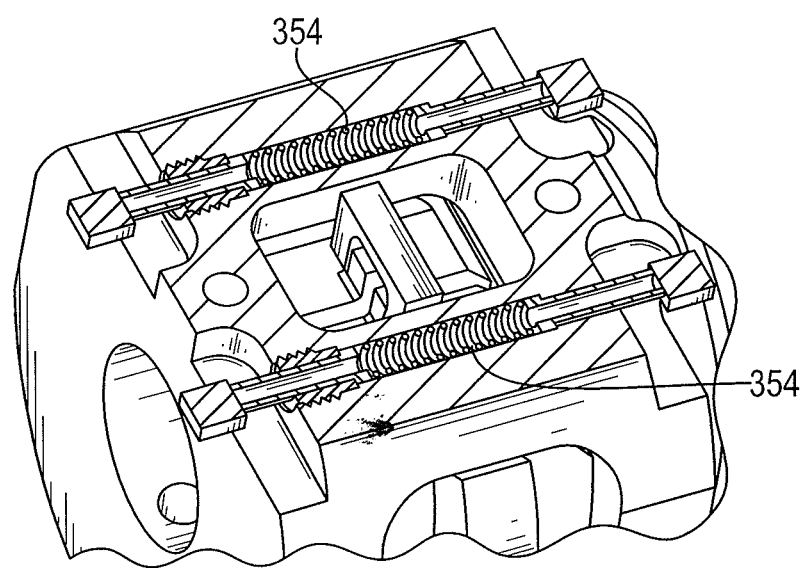
FIG. 32 shows a perspective detail view of a trigger mechanism having redundant centering springs.
Figure 33:
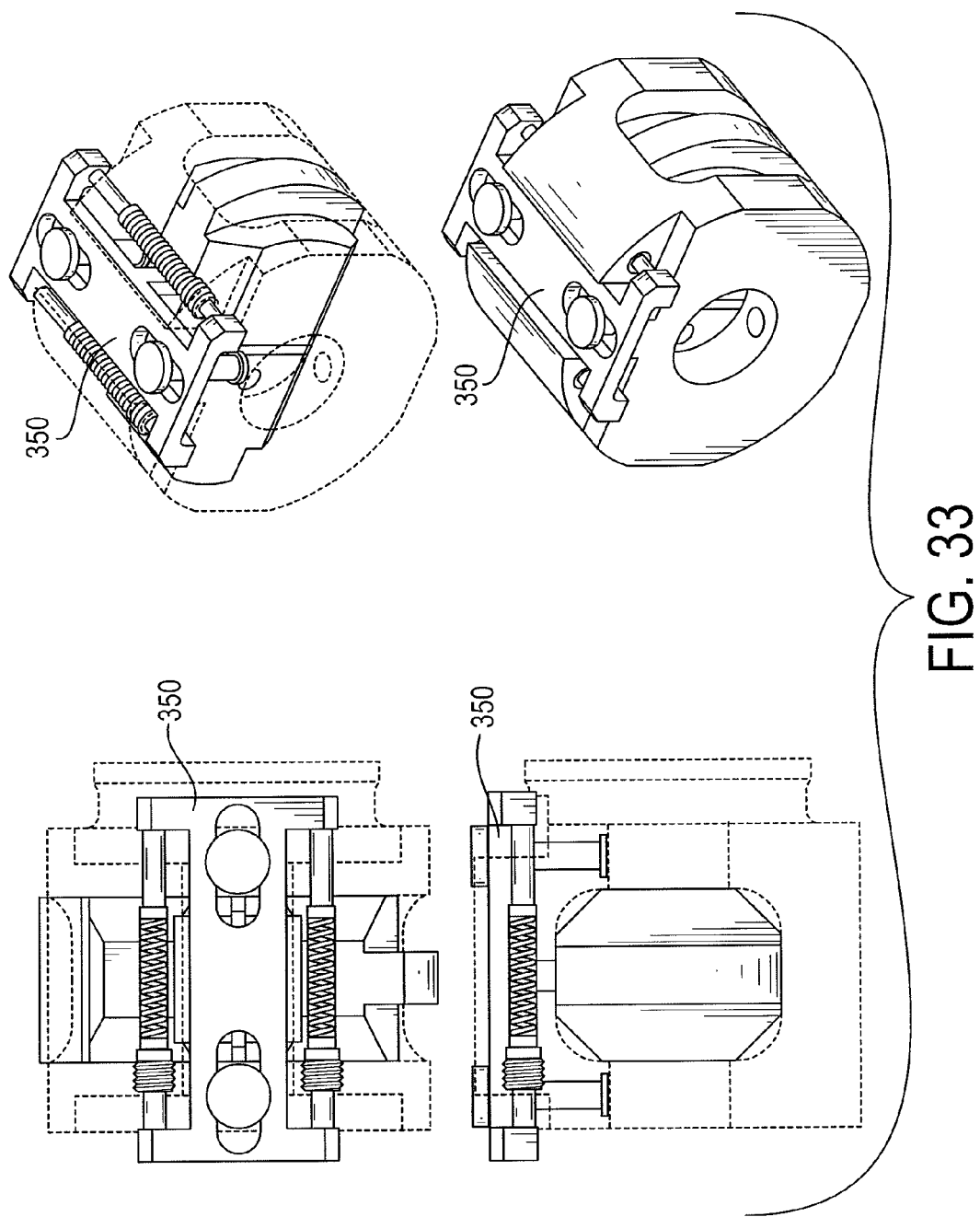
FIG. 33 shows various detail views of a locking mechanism with a trigger mechanism having redundant centering springs.

FIGS. 25 and 26 show perspective views of an assembled tie rod assembly.

Turning now to FIGS. 27-33, an exemplary embodiment of the tie rod assembly is shown at 300. The tie rod assembly 300 is substantially the same as the above-referenced tie rod assembly 200, and consequently the same reference numerals but indexed by 100 are used to denote structures corresponding to similar structures in the tie rod assembly 200. In addition, the foregoing description of the tie rod assembly 200 is equally applicable to the tie rod assembly 300 except as noted below. Moreover, it will be appreciated upon reading and understanding the specification that aspects of the tie rod assemblies may be substituted for one another or used in conjunction with one another where applicable.

The lock housing 308 may have only one slot 316 through the ribs 314. Therefore, the lock segment 322 will engage within 360 degrees of turning the ballscrew. Having only one slot may strengthen the ribs 314 allowing a higher load capacity for the latch segment 320 without unduly effecting backlash before the lock segment 322 engages.

Further, because of the trigger mechanism 350, the lock segment 322 includes only the axial flange 326, and no circumferential flange. Further, having only the axial flange 326 allows for the lock segment 322 to annunciate a centering spring 354 failure by engaging with the axial ridge 318 without requiring a primary load path failure.

Still further, the trigger mechanism 350 may include a second centering spring 354 to reduce the probability of losing the centering spring function.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A stabilizer actuator having a first end for connecting to an aircraft support structure and a second end for connecting to a stabilizer, the actuator including a primary load path for transmittal of loads acting on the stabilizer to the aircraft support structure, and a secondary load path for transmittal of loads acting on the stabilizer to the aircraft su ort structure u on failure of the primary load path, the secondary load path comprising:
   a tie rod extending along a longitudinal axis;
   a load path locking mechanism coupled to the tie rod;
   a lock housing having a central bore for receiving the locking mechanism; and
   at least one radially movable segment that, upon failure of the primary load path, moves radially to lock the tie rod to the lock housing against axial and/or radial movement,
   wherein an inner surface defining the central bore includes the at least one protrusion extending radially inward from the inner surface,
   wherein the locking mechanism includes the at least one segment, and the at least one segment is configured to move radially outward from a standby position to a failsafe position to prevent relative movement of the tie rod with respect to the lock housing by interacting with the at least one protrusion, and wherein the at least one protrusion comprises at least one inwardly extending circumferential rib and wherein the at least one segment comprises a latch segment having an outward extending circumferential flange configured to prevent relative axial movement between the tie rod and the lock housing by interacting with the at least one rib.

2. A stabilizer actuator having a first end for connecting to an aircraft support structure and a second end for connecting to a stabilizer, the actuator including a primary load path for transmittal of loads acting on the stabilizer to the aircraft support structure, and a secondary load path for transmittal of loads acting on the stabilizer to the aircraft support structure upon failure of the primary load path, the secondary load path comprising:

a tie rod extending along a longitudinal axis;
a load path locking mechanism coupled to the tie rod;
a lock housing having a central bore for receiving the locking mechanism; and
at least one radially movable segment that, upon failure of the primary load path, moves radially to lock the tie rod to the lock housing against axial and/or radial movement,
wherein an inner surface defining the central bore includes the at least one protrusion extending radially inward from the inner surface,
wherein the locking mechanism includes the at least one segment, and the at least one segment is configured to move radially outward from a standby position to a failsafe position to prevent relative movement of the tie rod with respect to the lock housing by interacting with the at least one protrusion, and
wherein the at least one protrusion comprises at least one inwardly extending axial ridge and wherein the at least one segment comprises a lock segment having an outward extending axial flange configured to prevent relative radial movement between the tie rod and the lock housing by interacting with the at least one ridge.

3. A stabilizer actuator having a first end for connecting to an aircraft support structure and a second end for connecting to a stabilizer, the actuator including a primary load path for transmittal of loads acting on the stabilizer to the aircraft support structure, and a secondary load path for transmittal of loads acting on the stabilizer to the aircraft su ort structure u on failure of the primary load path, the secondary load path comprising:

a tie rod extending along a longitudinal axis;
a load path locking mechanism coupled to the tie rod;
a lock housing having a central bore for receiving the locking mechanism; and
at least one radian movable segment that, upon failure of the primary load path, moves radially to lock the tie rod to the lock housing against axial and/or radial movement,
wherein the locking mechanism further comprises a spring pack for radially moving the segment outward from the standby position to the failsafe position, and
wherein the spring pack includes an inner spring having a first twist direction and a coaxial outer spring having a second twist direction opposite the first twist direction.

4. A stabilizer actuator having a first end for connecting to an aircraft support structure and a second end for connecting to a stabilizer, the actuator including primary load path for transmittal of loads acting on the stabilizer to the aircraft support structure, and a secondary load path for transmittal of loads acting on the stabilizer to the aircraft support structure upon failure of the primary load path, the secondary load path comprising:

a tie rod extending along a longitudinal axis;
a load path locking mechanism coupled to the tie rod;
a lock housing having a central bore for receiving the locking mechanism; and
at least one radially movable segment that, upon failure of the primary load path, moves radially to lock the tie rod to the lock housing against axial and/or radial movement,
wherein the locking mechanism further comprises a trigger mechanism configured to trigger movement of the segment to the failsafe position when the a load path fails, and
wherein the trigger mechanism is axially slidable with respect to the segment.

5. A stabilizer actuator having a first end for connecting to an aircraft support structure and a second end for connecting to a stabilizer, the actuator including a primary load path for transmittal of loads acting on the stabilizer to the aircraft support structure, and a secondary load path for transmittal of loads acting on the stabilizer to the aircraft support structure upon failure of the primary load path, the secondary load path comprising:

a tie rod extending along a longitudinal axis;
a load path locking mechanism coupled to the tie rod at an end of the tie rod;
a lock housing having a central bore for receiving the locking mechanism; and
at least one radially movable segment that, upon failure of the primary load path, moves radially to lock the tie rod to the lock housing against axial and/or radial movement.

6. The stabilizer actuator of claim 5, further comprising a threaded retainer between the locking mechanism and the tie rod for adjustably retaining the locking mechanism in the lock housing.

7. The stabilizer actuator of claim 5, wherein the tie rod is rigidly coupled to a ballscrew of the primary load path.

8. The stabilizer actuator of claim 5, further comprising at least one protrusion having at least one inwardly extending circumferential rib and wherein the segment comprises a latch segment having an outwardly extending circumferential flange configured to prevent relative axial movement between the tie rod and the lock housing by interacting with the at least one rib, and wherein the at least one protrusion comprises an axial slot through the at least one rib forming at least one inwardly extending axial ridge and wherein the at least one segment comprises a lock segment having an outward extending axial flange configured to prevent relative radial movement between the tie rod and the lock housing by interacting with the at least one ridge.

9. A method of testing the stabilizer actuator of claim 5, said method comprising:

removing a lower primary load path gimbal pin to simulate a primary load path failure;
applying a first load to the primary load path; and
operating the actuator.

10. The stabilizer actuator of claim 5, wherein an inner surface defining the central bore includes the at least one protrusion extending radially inward from the inner surface, wherein the locking mechanism includes the at least one segment, and the at least one segment is configured to move radially outward from a standby position to a failsafe position to prevent relative movement of the tie rod with respect to the lock housing by interacting with the at least one protrusion.

11. The stabilizer actuator of claim 10, wherein the at least one protrusion comprises at least one inwardly extending circumferential rib and wherein the at least one segment comprises a latch segment having an outward extending circumferential flange configured to prevent relative axial movement between the tie rod and the lock housing by interacting with the at least one rib.

12. The stabilizer actuator of claim 10, wherein the at least one protrusion comprises at least one inwardly extending axial ridge and wherein the at least one segment comprises a lock segment having an outward extending axial flange configured to prevent relative radial movement between the tie rod and the lock housing by interacting with the at least one ridge.

13. The stabilizer actuator of claim 10, wherein the lock housing further comprises one or more radial ports adjacent to the protrusion thereby allowing access to reset the locking mechanism from the failsafe position to the standby position.

14. The stabilizer actuator of claim 5, wherein the locking mechanism further comprises a spring pack for radially moving the segment outward from the standby position to the failsafe position.

15. The stabilizer actuator of claim 14, wherein the spring pack includes an inner spring having a first twist direction and a coaxial outer spring having a second twist direction opposite the first twist direction.

16. The stabilizer actuator of claim 5, wherein the locking mechanism further comprises a trigger mechanism configured to trigger movement of the segment to the failsafe position when the primary load path fails.

17. The stabilizer actuator of claim 16, wherein the trigger mechanism comprises at least one centering spring configured to bias the trigger mechanism towards a reset position.

18. The stabilizer actuator of claim 17, wherein the segment comprises a hook and the trigger mechanism comprises at least one trigger latch configured to latch with the hook when the trigger mechanism is in the reset position and the segment is in the standby position, thereby retaining the segment in the standby position.

19. The stabilizer actuator of claim 16, wherein the trigger mechanism is axially slidable with respect to the segment.

20. A stabilizer actuator having a first end for connecting to an aircraft support structure and a second end for connecting to a stabilizer, the actuator including a primary load path for transmittal of loads acting on the stabilizer to the aircraft support structure, and a secondary load path for transmittal of loads acting on the stabilizer to the aircraft support structure upon failure of the primary load path, the secondary load path comprising:
   a tie rod extending along a longitudinal axis;
   a load path locking mechanism coupled to the tie rod;
   a lock housing having a central bore for receiving the locking mechanism; and
   at least one radially movable segment that, upon failure of the primary load path, moves radially to lock the tie rod to the lock housing against axial and/or radial movement,
   wherein an inner surface defining the central bore includes the at least one protrusion extending radially inward from the inner surface,
   wherein the locking mechanism includes the at least one segment, and the at least one segment is configured to move radially outward from a standby position to a failsafe position to prevent relative movement of the tie rod with respect to the lock housing by interacting with the at least one protrusion, and
   wherein the lock housing further comprises one or more radial ports adjacent to the protrusion thereby allowing access to reset the locking mechanism from the failsafe position to the standby position.

21. A method of resetting the stabilizer actuator of claim 20, said method comprising:
   removing a plug from the one or more ports of the lock housing; and
   inserting a reset tool into the one or more ports of the lock housing to push the segment out of engagement with the protrusion.

22. The method of claim 21, wherein the inserting includes threading the tool into the lock housing for increased leverage and control.

23. The method of claim 21, further comprising:
   applying a load opposite from the load causing engagement of the locking mechanism;
   removing the reset tool from the lock housing; and
   reinstalling the plug.

24. An actuator comprising:
   a drive motor and gear assembly;
   a ballscrew driven by the motor;
   a support gimbal for coupling the ballscrew to a support structure;
   a ball nut driven by the ballscrew;
   a tie rod extending along a longitudinal axis and rigidly coupled to the ballscrew;
   a locking mechanism coupled to the tie rod at an end of the tie rod;
   a lock housing having a central bore for receiving the locking mechanism; and
   at least one radially movable segment that, upon structural failure of the drive motor and gear assembly, the ballscrew, and/or the support gimbal, moves radially to lock the tie rod to the lock housing against axial and/or radial movement.

25. The actuator of claim 24, wherein an inner surface defining the central bore includes at least one protrusion extending radially inward from the inner surface,
   wherein the locking mechanism includes the at least one segment, and the at least one segment is configured to move radially outward from a standby position to a failsafe position to prevent relative movement of the tie rod with respect to the lock housing by interacting with the at least one protrusion.

* * * * *